US012052798B2

(12) United States Patent
Tamura et al.

(10) Patent No.: US 12,052,798 B2
(45) Date of Patent: *Jul. 30, 2024

(54) METHOD FOR SYNCHRONIZING STATUS OF UE IN A COMMUNICATION NETWORK

(71) Applicant: NEC CORPORATION, Tokyo (JP)

(72) Inventors: Toshiyuki Tamura, Tokyo (JP); Kundan Tiwari, Tokyo (JP)

(73) Assignee: NEC CORPORATION, Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 17/313,133

(22) Filed: May 6, 2021

(65) Prior Publication Data

US 2021/0258772 A1    Aug. 19, 2021

Related U.S. Application Data

(60) Division of application No. 16/869,665, filed on May 8, 2020, now abandoned, which is a continuation of
(Continued)

(30) Foreign Application Priority Data

May 18, 2018   (IN) .............................. 201811018792

(51) Int. Cl.
*H04W 4/00*        (2018.01)
*H04W 8/26*        (2009.01)
(Continued)

(52) U.S. Cl.
CPC ............. *H04W 8/26* (2013.01); *H04W 48/20* (2013.01); *H04W 76/27* (2018.02)

(58) Field of Classification Search
CPC ....... H04W 8/26; H04W 48/20; H04W 76/27; H04W 8/065; H04L 45/50; H04L 45/52;
(Continued)

(56) References Cited

U.S. PATENT DOCUMENTS 5,920,814 A    7/1999  Sawyer et al.
7,155,222 B1  12/2006  Jain et al.
(Continued)

FOREIGN PATENT DOCUMENTS

CN    108924959 A    11/2018
JP    2019-532582 A  11/2019
(Continued)

OTHER PUBLICATIONS

3GPP TS 33.401; "3rd Generation Partnership Project; Technical Specification Group Services and System Aspects: 3GPP System Architecture Evolution (SAE); Security architecture (Release 15)", 3GPP TS 33.401 V15.3.0, Mar. 28, 2018.
(Continued)

*Primary Examiner* — Stephen M D Agosta

(57) ABSTRACT

The present disclosure relates to synchronizing a temporary identity in the UE and the network when the UE is RRC Inactive state over 3GPP access and temporary identity of the UE is changed over a Non-3GPP access in a scenario when the UE is connected to the same AMF via 3GPP and non-3GPP access.

2 Claims, 14 Drawing Sheets

Related U.S. Application Data application No. PCT/JP2019/018822, filed on May 10, 2019.

(51) Int. Cl.
*H04W 48/20* (2009.01)
*H04W 76/27* (2018.01)

(58) Field of Classification Search
CPC ..... H04L 63/0272; H04L 67/14; H04L 67/51; H04B 7/2609
See application file for complete search history.

(56) References Cited

U.S. PATENT DOCUMENTS

| | | | |
|---|---|---|---|
| 8,725,155 B2 | 5/2014 | Cheneau-Grehalle et al. | |
| 9,603,001 B1 | 3/2017 | Malhotra et al. | |
| 10,555,253 B2* | 2/2020 | Chandramouli | H04W 76/27 |
| 10,694,365 B2 | 6/2020 | Lee et al. | |
| 11,140,655 B2* | 10/2021 | Niemi | H04W 72/04 |
| 11,265,700 B2* | 3/2022 | Huber | H04W 76/11 |
| 2010/0041402 A1 | 2/2010 | Gallagher et al. | |
| 2012/0202491 A1 | 8/2012 | Fox et al. | |
| 2012/0224476 A1* | 9/2012 | Jin | H04L 5/0091 370/229 |
| 2013/0031271 A1 | 1/2013 | Bosch et al. | |
| 2013/0210466 A1 | 8/2013 | Arvidsson et al. | |
| 2014/0036872 A1 | 2/2014 | Shaheen | |
| 2015/0181504 A1 | 6/2015 | Tsai | |
| 2015/0249952 A1* | 9/2015 | Lee | H04L 5/0073 370/312 |
| 2015/0312809 A1 | 10/2015 | Shu et al. | |
| 2015/0365914 A1* | 12/2015 | Yu | H04B 7/0695 455/458 |
| 2016/0262015 A1 | 9/2016 | Lee et al. | |
| 2016/0286385 A1 | 9/2016 | Ryu et al. | |
| 2016/0309379 A1 | 10/2016 | Pelletier et al. | |
| 2017/0201884 A1* | 7/2017 | Zhong | H04L 9/0894 |
| 2017/0318452 A1 | 11/2017 | Hahn et al. | |
| 2017/0332226 A1* | 11/2017 | Bharatia | H04W 76/10 |
| 2017/0374644 A1 | 12/2017 | Ryu et al. | |
| 2018/0160292 A1 | 6/2018 | Chastain et al. | |
| 2018/0184246 A1 | 6/2018 | Ryu et al. | |
| 2018/0227871 A1* | 8/2018 | Singh | H04W 48/18 |
| 2018/0270786 A1* | 9/2018 | Nair | H04W 12/12 |
| 2018/0310162 A1 | 10/2018 | Kim et al. | |
| 2018/0324751 A1* | 11/2018 | Hampel | H04W 68/02 |
| 2018/0332523 A1* | 11/2018 | Faccin | H04W 36/14 |
| 2018/0352416 A1 | 12/2018 | Ryu et al. | |
| 2018/0376384 A1 | 12/2018 | Youn et al. | |
| 2018/0376444 A1 | 12/2018 | Kim et al. | |
| 2018/0376446 A1* | 12/2018 | Youn | H04W 8/20 |
| 2019/0037516 A1* | 1/2019 | Kim | H04W 60/005 |
| 2019/0045408 A1* | 2/2019 | Kim | H04W 76/27 |
| 2019/0059067 A1 | 2/2019 | Lee et al. | |
| 2019/0082417 A1 | 3/2019 | Bolle et al. | |
| 2019/0174554 A1 | 6/2019 | Deenoo et al. | |
| 2019/0208562 A1 | 7/2019 | Kim et al. | |
| 2019/0215691 A1 | 7/2019 | Salkintzis | |
| 2019/0261264 A1 | 8/2019 | Lou et al. | |
| 2019/0268806 A1* | 8/2019 | Zhu | H04W 28/0804 |
| 2019/0335330 A1 | 10/2019 | Salkintzis | |
| 2020/0029205 A1 | 1/2020 | Hu et al. | |
| 2020/0059777 A1 | 2/2020 | Drevö et al. | |
| 2020/0084613 A1 | 3/2020 | Ying et al. | |
| 2021/0058789 A1* | 2/2021 | Hu | H04W 12/122 |
| 2021/0112491 A1* | 4/2021 | Chen | H04W 48/18 |

FOREIGN PATENT DOCUMENTS

| | | |
|---|---|---|
| WO | 2018/070689 A1 | 4/2018 |
| WO | 2018/088836 A1 | 5/2018 |

OTHER PUBLICATIONS

3GPP TS 23.502; "3rd Generation Partnership Project; Technical Specification Group Services and System Aspects: Procedures for the 5G System; Stage 2 (Release 15)", 3GPP TS 23.502 V0.3.0, Apr. 20, 2017.

3rd Generation Partnership Project; Technical Specification Group Services and System Aspects; System Architecture or the 5G System; Stage 2 (Release 15), 3GPP TS 23.501 V15.1.0 (Mar. 28, 2018).

NEC, RRC-Inactive state and GUTI reallocation procedure over non-3GPP access, 3GPP TSG-SA WG2 #127bis, S2-185312, (May 22, 2018).

NEC, RRC-Inactive state and GUTI reallocation procedure over non-3GPP access, 3GPP TSG-SA WG2#128, S2-186759, (Jun. 26, 2018).

Chinese Office Action for CN Application No. 201980006116.7 mailed on May 6, 2022 with English Translation.

Japanese Office Action for JP Application No. 2021-157594, mailed on Aug. 30, 2022 with English Translation.

U.S. Office Action for U.S. Appl. No. 17/313,593, mailed on Jul. 10, 2023.

U.S. Office Action for U.S. Appl. No. 17/313,593, mailed on Jun. 2, 2023.

U.S. Office Action for U.S. Appl. No. 17/313,593, mailed on Dec. 16, 2022.

\* cited by examiner

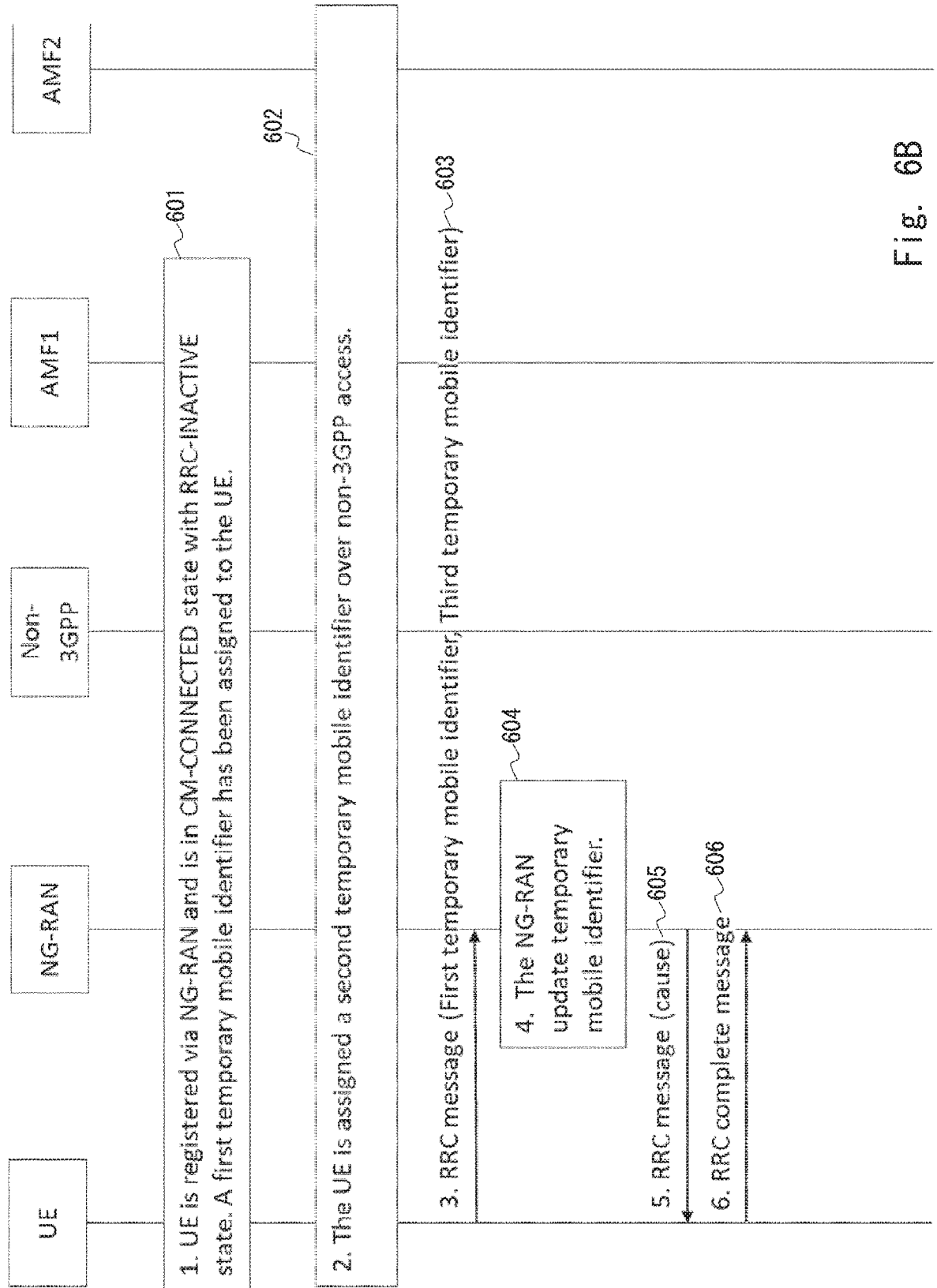

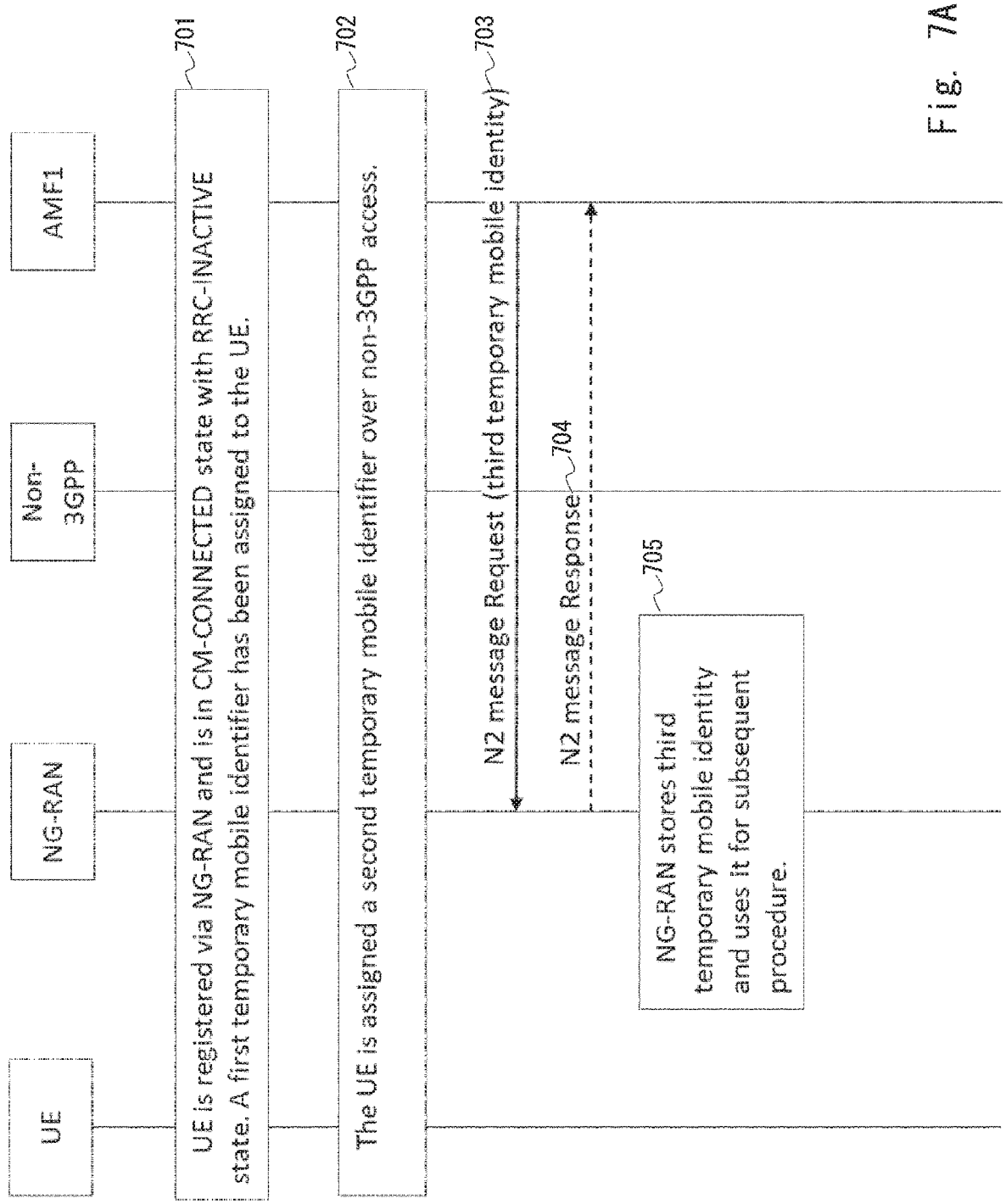

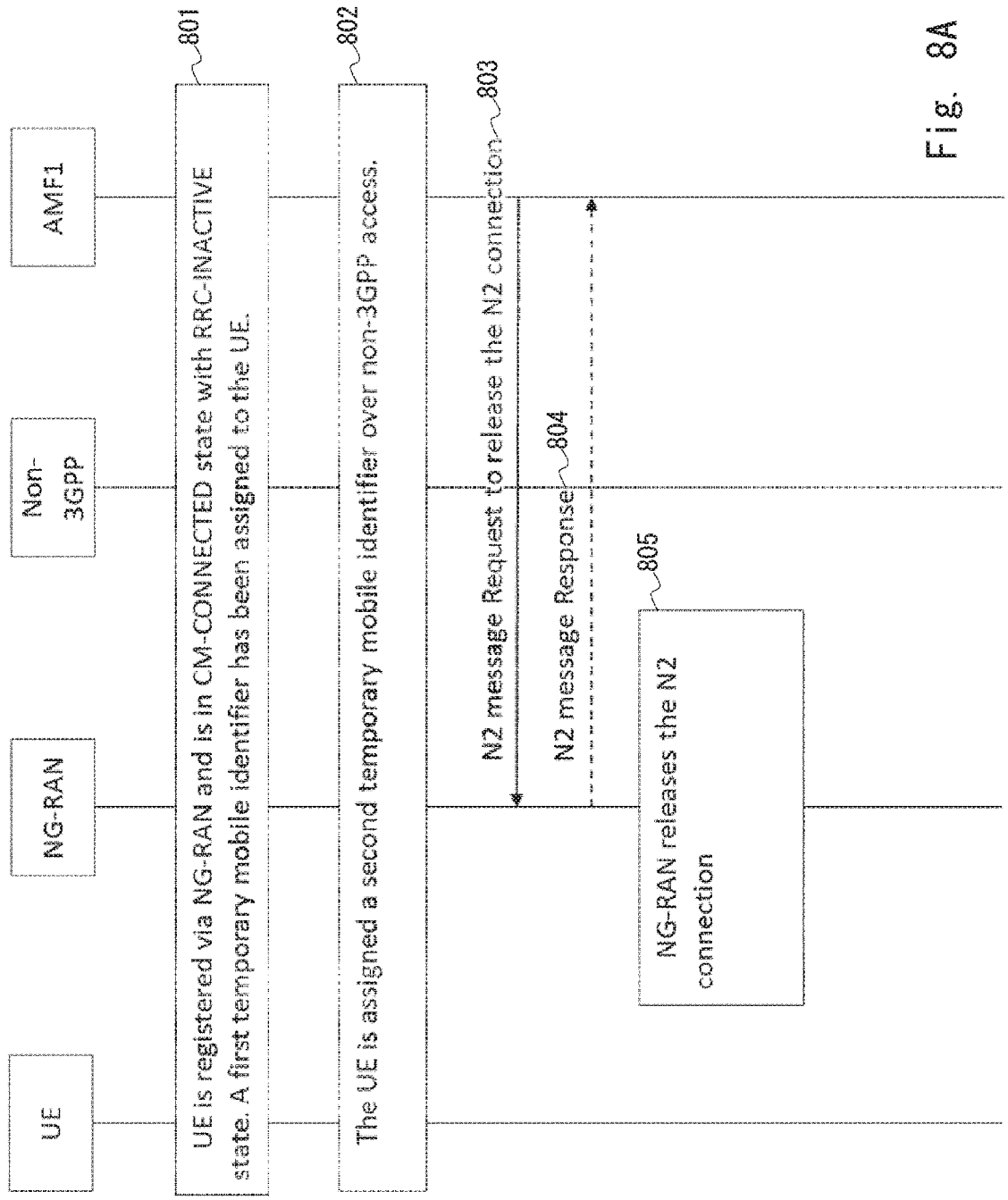

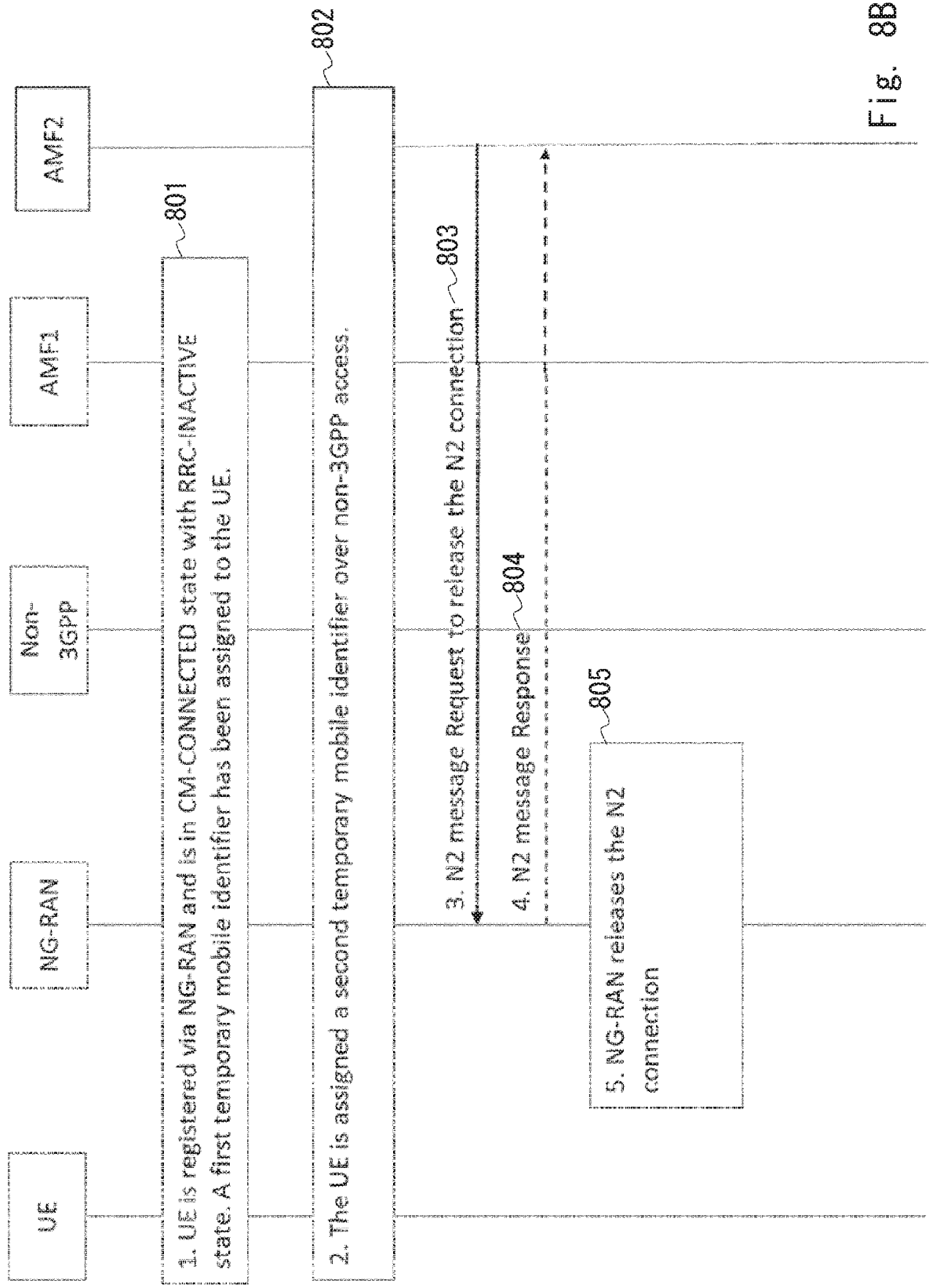

METHOD FOR SYNCHRONIZING STATUS OF UE IN A COMMUNICATION NETWORK

CROSS REFERENCE TO RELATED APPLICATIONS

This is a divisional application based upon U.S. patent application Ser. No. 16/869,665 filed May 8, 2020, which is a Continuation of U.S. National Stage of International Application No. PCT/JP2019/018822 filed May 10, 2019, claiming priority based on Indian Patent Application No. 201811018792 filed May 18, 2018, the contents of all of which are incorporated herein by reference in their entirety.

TECHNICAL FIELD

The present disclosure relates to the method and system of synchronizing the status of a UE in a communication network. Specifically the present disclosure relates to synchronizing a temporary identity in the UE and the network when the UE is RRC Inactive state over 3GPP access and temporary identity of the UE is changed over a Non-3GPP access in a scenario when the UE is connected to the same AMF via 3GPP and non-3GPP access.

BACKGROUND ART

In 5GS both 3GPP access and Non-3GPP access is connected to AMF. A UE can be connected to a PLMN or different PLMN via 3GPP access and non-3GPP access simultaneously. The UE and the network maintain separate Registration Management context and CM state for a 3GPP access and a non-3GPP access. In case the UE is connected to the same PLMN via 3GPP access and non-3GPP access then the UE is connected to a same AMF via 3GPP access and non-3GPP access. The AMF allocates single 5G-GUTI as a temporary identifier for both RM contexts. The UE will use the same 5G-GUTI to communicate via 3GPP access and non-3GPP access. The RAN will perform, to UE in the RRC Inactive state, RAN paging using S-TMSI. Here, 5G-GUTI may be structured by GUAMI and 5G-S-TMSI.

The S-TMSI implies a mobile NAS temporary identifier for paging. i.e. 5G S-TMSI for paging over EUTRA, I-RNTI for paging UE over New Radio when UE is in RRC_INACTIVE state, and 5G S-TMSI for paging UE over new Radio when UE is in RRC_IDLE state. I-RNTI is unique identification used to identify the UE context for RRC_INACTIVE.

The above UE and network procedure creates following two issues when the UE is in RRC_INACTIVE state in CM-CONNECTED State.

First problem with the existing technology is that, UE cannot be paged with correct mobile identity when the UE is in INACTIVE state in CM-CONNECTED state and GUTI of the UE is changed over non-3GPP access. That's the reason why mobile identities respectively stored in the UE and the 3GPP access have different values each other i.e. out of synchronization while the paging for the UE by the AMF is not occurred because there is CM-CONNECTED state between the UE and the AMF.

More specifically, when a UE is in INACTIVE state in CM-CONNECTED state over 3GPP access and 5G-GUTI can be changed over non-3GPP access in case when the UE is performing initial registration procedure over non-3GPP access or when the UE is already attached to non-3GPP access, the UE is in CM-CONNECTED state and the AMF assigned new 5G-GUTI to the UE. In this scenario, the S-TMSI stored in NG-RAN is not updated from an old S-TMSI that is a part of old assigned 5G-GUTI to a new S-TMSI that is a part of new assigned 5G-GUTI. Therefore, the NG-RAN still contains old S-TMSI of the UE. When a NG-RAN is required to page the UE then the NG-RAN will use the old S-TMSI in paging procedure and the paging procedure will fail since the UE will use the new S-TMSI to identify the paging message. Hereinafter, "CM (Connection Management)" is also denoted as "5GMM (5GS Mobility Management)".

In the other words, the following definitions regarding "5GMM" related modes are applicable for any aspects.

5GMM-IDLE mode: In any aspects, a UE in 5GMM-IDLE mode means the UE can be either in 5GMM-IDLE mode over 3GPP access or in 5GMM-IDLE mode over non-3GPP access.

5GMM-CONNECTED mode: In any aspects, a UE in 5GMM-CONNECTED mode means the UE can be either in 5GMM-CONNECTED mode over 3GPP access or in 5GMM-CONNECTED mode over non-3GPP access.

5GMM-IDLE mode over 3GPP access: A UE is in 5GMM-IDLE mode over 3GPP access when no N1 NAS signalling connection between the UE and network (e.g. AMF) over 3GPP access exists. The term 5GMM-IDLE mode over 3GPP access corresponds to the term CM-IDLE state for 3GPP access used in the any aspects.

5GMM-CONNECTED mode over 3GPP access: A UE is in 5GMM-CONNECTED mode over 3GPP access when a N1 NAS signalling connection between the UE and network (e.g. AMF) over 3GPP access exists. The term 5GMM-CONNECTED mode over 3GPP access corresponds to the term CM-CONNECTED state for 3GPP access used in the any aspects.

5GMM-IDLE mode over non-3GPP access: A UE is in 5GMM-IDLE mode over non-3GPP access no N1 NAS signalling connection between the UE and network (e.g. AMF) over non-3GPP access exists. The term 5GMM-IDLE mode over non-3GPP access corresponds to the term CM-IDLE state for non-3GPP access used in the any aspects.

5GMM-CONNECTED mode over non-3GPP access: A UE is in 5GMM-CONNECTED mode over non-3GPP access when it has N1 NAS signalling connection between the UE and network (e.g. AMF) over non-3GPP access exists. The term 5GMM-CONNECTED mode over non-3GPP access corresponds to the term CM-CONNECTED state for non-3GPP access used in the any aspects.

Another problem with the existing technology is that the NG-RAN cannot route a UE to a new AMF over 3GPP access when the AMF is relocated over non-3GPP access.

A UE is registered to an AMF via 3GPP access and the UE is in INACTIVE state in CM-CONNECTED state. When the UE is in CM-CONNECTED state via non-3GPP access to the same AMF for example when the UE has initiated registration procedure via non-3GPP access to the same AMF or the UE is already registered to the same AMF via non-3GPP access and is in CM-CONNECTED state then the AMF may perform AMF relocation procedure due to load re-balancing procedure and relocated the UE context to either the new AMF or the UDSF. In this scenario the new AMF allocate a new 5G-GUTI to the UE and sent it to the UE via non-3GPP access in a NAS message. In this scenario the UE shall use the new S-TMSI in AS signalling procedure via 3GPP access so that the NG-RAN will route the UE to the new AMF. However when the UE performs the Resume Procedure via 3GPP access when the UE is in INACTIVE state in CM-CONNECTED Mode, the UE cannot set new S-TMSI as the UE temporary identifier in the RRC Connection Resume Request message to the NG-RAN since the S-TMSI is not defined in the RRC Connection Resume Request message as a parameter that can be populated. When the NG-RAN will receive RRC Connection Resume Request without new S-TMSI then it will resume the connection to the old AMF as NG-RAN maintains the old S-TMSI for the UE. Therefore, there is a need of an effective communication method and system for synchronizing a temporary identity in the UE and the network when the UE is RRC Inactive state over 3GPP access and temporary identity of the UE is changed over a Non-3GPP access in a scenario when the UE is connected to the same AMF via 3GPP and non-3GPP access.

SUMMARY OF INVENTION

Technical Problem

First problem with the existing technology is that, UE cannot be paged with correct mobile identity when the UE is in INACTIVE state in CM-CONNECTED state and GUTI of the UE is changed over non-3GPP access. That's the reason why mobile identities respectively stored in the UE and the 3GPP access have different values each other i.e. out of synchronization while the paging for the UE by the AMF is not occurred because there is CM-CONNECTED state between the UE and the AMF.

More specifically, when a UE is in INACTIVE state in CM-CONNECTED state over 3GPP access and 5G-GUTI can be changed over non-3GPP access in case when the UE is performing initial registration procedure over non-3GPP access or when the UE is already attached to non-3GPP access, the UE is in CM-CONNECTED state and the AMF assigned new 5G-GUTI to the UE. In this scenario, the S-TMSI stored in NG-RAN is not updated from an old S-TMSI that is a part of old assigned 5G-GUTI to a new S-TMSI that is a part of new assigned 5G-GUTI. Therefore, the NG-RAN still contains old S-TMSI of the UE. When a NG-RAN is required to page the UE then the NG-RAN will use the old S-TMSI in paging procedure and the paging procedure will fail since the UE will use the new S-TMSI to identify the paging message. Hereinafter, "CM (Connection Management)" is also denoted as "5GMM (5GS Mobility Management)".

In the other words, the following definitions regarding "5GMM" related modes are applicable for any aspects.
  5GMM-IDLE mode: In any aspects, a UE in 5GMM-IDLE mode means the UE can be either in 5GMM-IDLE mode over 3GPP access or in 5GMM-IDLE mode over non-3GPP access.
  5GMM-CONNECTED mode: In any aspects, a UE in 5GMM-CONNECTED mode means the UE can be either in 5GMM-CONNECTED mode over 3GPP access or in 5GMM-CONNECTED mode over non-3GPP access.
  5GMM-IDLE mode over 3GPP access: A UE is in 5GMM-IDLE mode over 3GPP access when no N1 NAS signalling connection between the UE and network (e.g. AMF) over 3GPP access exists. The term 5GMM-IDLE mode over 3GPP access corresponds to the term CM-IDLE state for 3GPP access used in the any aspects.
  5GMM-CONNECTED mode over 3GPP access: A UE is in 5GMM-CONNECTED mode over 3GPP access when a N1 NAS signalling connection between the UE and network (e.g. AMF) over 3GPP access exists. The term 5GMM-CONNECTED mode over 3GPP access corresponds to the term CM-CONNECTED state for 3GPP access used in the any aspects.
  5GMM-IDLE mode over non-3GPP access: A UE is in 5GMM-IDLE mode over non-3GPP access no N1 NAS signalling connection between the UE and network (e.g. AMF) over non-3GPP access exists. The term 5GMM-IDLE mode over non-3GPP access corresponds to the term CM-IDLE state for non-3GPP access used in the any aspects.
  5GMM-CONNECTED mode over non-3GPP access: A UE is in 5GMM-CONNECTED mode over non-3GPP access when it has N1 NAS signalling connection between the UE and network (e.g. AMF) over non-3GPP access exists. The term 5GMM-CONNECTED mode over non-3GPP access corresponds to the term CM-CONNECTED state for non-3GPP access used in the any aspects.

Another problem with the existing technology is that the NG-RAN cannot route a UE to a new AMF over 3GPP access when the AMF is relocated over non-3GPP access.

A UE is registered to an AMF via 3GPP access and the UE is in INACTIVE state in CM-CONNECTED state. When the UE is in CM-CONNECTED state via non-3GPP access to the same AMF for example when the UE has initiated registration procedure via non-3GPP access to the same AMF or the UE is already registered to the same AMF via non-3GPP access and is in CM-CONNECTED state then the AMF may perform AMF relocation procedure due to load re-balancing procedure and relocated the UE context to either the new AMF or the UDSF. In this scenario the new AMF allocate a new 5G-GUTI to the UE and sent it to the UE via non-3GPP access in a NAS message. In this scenario the UE shall use the new S-TMSI in AS signalling procedure via 3GPP access so that the NG-RAN will route the UE to the new AMF. However when the UE performs the Resume Procedure via 3GPP access when the UE is in INACTIVE state in CM-CONNECTED Mode, the UE cannot set new S-TMSI as the UE temporary identifier in the RRC Connection Resume Request message to the NG-RAN since the S-TMSI is not defined in the RRC Connection Resume Request message as a parameter that can be populated. When the NG-RAN will receive RRC Connection Resume Request without new S-TMSI then it will resume the connection to the old AMF as NG-RAN maintains the old S-TMSI for the UE. Therefore, there is a need of an effective communication method and system for synchronizing a temporary identity in the UE and the network when the UE is RRC Inactive state over 3GPP access and temporary identity of the UE is changed over a Non-3GPP access in a scenario when the UE is connected to the same AMF via 3GPP and non-3GPP access.

Solution to Problem

The following presents a simplified summary of the subject matter in order to provide a basic understanding of some aspects of subject matter aspects. This summary is not an extensive overview of the subject matter. It is not intended to identify key/critical elements of the aspects or to delineate the scope of the subject matter.

In order to overcome the problems as discussed above, the present disclosure provides solutions wherein in one aspect, it is proposed that by synchronizing a temporary identity in the UE and the network when the UE is RRC Inactive state over 3GPP access and temporary identity of the UE is changed over a Non-3GPP access when the UE is connected to the same AMF via 3GPP and non-3GPP access, the problem can be solved.

In another aspect of the present disclosure, it is proposed a UE releases the assigned RRC resources and moves to the RRC IDLE state when the UE's temporary mobile identity changes via non-3GPP access by the AMF.

A further aspect of the present disclosure proposed that a UE and an NG-RAN releases the assigned RRC resources and moves to the RRC IDLE state when the UE's temporary mobile identity changes via non-3GPP access by the AMF.

A further aspect of the present disclosure proposed that a UE updates the new temporary mobile identity to the NG-RAN by a RRC message.

Another aspect of the present disclosure proposes that the AMF updates the NG-RAN with the new temporary mobile identity assigned to the UE via non-3GPP access.

The solutions proposed by the present disclosure provides a technical advantage wherein the synchronizing of a temporary identity used for paging between the UE and the network even when the UE is RRC Inactive state over 3GPP access and temporary identity of the UE is changed over a Non-3GPP access in a case where the UE is connected to the same AMF via 3GPP and non-3GPP access. Therefore, the UE can be paged with the correct temporary identity in a case where the UE is in INACTIVE state in CM-CONNECTED state and GUTI of the UE is changed over non-3GPP access and the NG-RAN can route a UE to a new AMF over the 3GPP access in a case where the AMF is relocated over non-3GPP access.

In an aspect of the present disclosure, there is provided a method for User Equipment (UE) comprising the steps of receiving through a 3GPP access node, a first temporary mobile identity for the UE from an Access and Mobility Function (AMF) of a Public Land Mobile Network (PLMN), during a first Non Access Stratum (NAS) procedure between the UE and the AMF, moving to 5GS Mobility Management (5GMM)-CONNECTED state with a Radio Resource Control (RRC) INACTIVE state over 3GPP access, receiving, through the non-3GPP access node, a second temporary mobile identity for the UE from the AMF, during a second NAS procedure between the UE and the AMF over non-3GPP access. The method further comprises moving from the 5GMM-CONNECTED state with the RRC INACTIVE state to 5GMM-IDLE state with RRC IDLE state upon reception of the second temporary mobile identity.

The method further comprises releasing stored RRC contexts and RRC resources which are stored in the UE and releasing RRC connection which has been established with the 3GPP access node, upon reception of the second temporary mobile identity.

According to another aspect, the method further comprises sending an RRC-message to the 3GPP access node for releasing RRC resources related to the UE and for releasing RRC connection which has been established with the UE before the moving from the 5GMM-CONNECTED state with the RRC INACTIVE state to 5GMM-IDLE state with RRC IDLE state.

In another aspect of the present disclosure, a method for a 3GPP access node is provided comprises transferring a first temporary mobile identity for a User Equipment (UE) from an Access and Mobility Function (AMF) of a Public Land Mobile Network (PLMN), during a first Non Access Stratum (NAS) procedure between the UE and the AMF, instructing the UE to move to a Radio Resource Control (RRC) INACTIVE state, wherein the UE maintain 5GS Mobility Management (5GMM)-CONNECTED state after the moving to the RRC INACTIVE state and storing an identity corresponding to the first temporary mobile identity for Radio Access Network (RAN) paging, wherein the method is further comprising receiving a message for releasing RRC resources related to the UE and for releasing RRC connection which has been established with the UE from the UE or the AMF, and releasing RRC resources which include the stored temporary mobile identity and the RRC connection, upon reception of the message for releasing RRC resources related to the UE.

According to another aspect, a method for an Access and Mobility Function (AMF) is disclosed. The method comprises sending, through a 3GPP access node, a first temporary mobile identity for the UE to the UE, during a first Non Access Stratum (NAS) procedure between the UE and the AMF of a Public land mobile network (PLMN) and updating from the first temporary mobile identity to a second temporary mobile identity and sending, through the non-3GPP access node, the second temporary mobile identity to the UE, during a second NAS procedure between the UE and the AMF, wherein the method is further comprising sending, to the 3GPP access node, a message for releasing RRC resources related to the UE and for releasing RRC connection which has been established with the UE, in a case where the second temporary mobile identity is sent to the UE through the non-3GPP access node.

According to another aspect of the present disclosure, a method for User Equipment (UE) is disclosed which comprises receiving, through a 3GPP access node, a first temporary mobile identity for the UE from an Access and Mobility Function (AMF) of a Public land mobile network (PLMN), during a first Non Access Stratum (NAS) procedure between the UE and the AMF, moving to 5GS Mobility Management (5GMM)-CONNECTED state with a Radio Resource Control (RRC) INACTIVE state, receiving, through the non-3GPP access node, a second temporary mobile identity for the UE from the AMF, during a second NAS procedure between the UE and the AMF over the non-3GPP access, wherein the method further comprises sending a third temporary mobile identity of the UE to the 3GPP access node, wherein the third temporary mobile identity is the second temporary mobile identity or is derived from the second mobile identity.

The third temporary mobile identity is sent in one of an RRC Connection Resume Request message and RRC Connection Reestablishment Request message, wherein the UE is configured to capable of re-entering to or keeping the RRC INACTIVE state after the sending the third temporary mobile identity.

According to yet another aspect, a method for a 3GPP access node is disclosed comprising transferring a first temporary mobile identity for a User Equipment (UE) from an Access and Mobility Function (AMF) of a Public land mobile network (PLMN), during a first Non Access Stratum (NAS) procedure between the UE and the AMF, instructing the UE to move a Radio Resource Control (RRC) INACTIVE state, wherein the UE maintain 5GS Mobility Management (5GMM)-CONNECTED state after the moving to the RRC INACTIVE state and storing an identity corresponding to the first temporary mobile identity for Radio Access Network (RAN) paging, wherein the method is further comprising receiving a third temporary mobile identity for the UE from the UE or the AMF, wherein the third temporary mobile identity is the second temporary mobile identity or is derived from the second temporary mobile identity.

According to still another aspect, a method for an Access and Mobility Function (AMF) comprises sending, through a 3GPP access node, a first temporary mobile identity for the UE to the UE, during a first Non Access Stratum (NAS) procedure between the UE and the AMF of a Public land mobile network (PLMN); and updating from the first temporary mobile identity to a second temporary mobile identity and sending, through the non-3GPP access node, the second temporary mobile identity to the UE, during a second NAS procedure between the UE and the AMF over non-3GPP access, wherein the method is further comprising: sending, to the 3GPP access node, a third temporary mobile identity for the UE in a case where the second temporary mobile identity is sent to the UE through the non-3GPP access node, wherein the third temporary mobile identity is the second temporary mobile identity or is derived from the second temporary mobile identity.

BRIEF DESCRIPTION OF DRAWINGS

The foregoing and further objects, features and advantages of the present subject matter will become apparent from the following description of exemplary aspects with reference to the accompanying drawings, wherein like numerals are used to represent like elements.

It is to be noted, however, that the appended drawings along with the reference numerals illustrate only typical aspects of the present subject matter, and are therefore, not to be considered for limiting of its scope, for the subject matter may admit to other equally effective aspects.

FIG. 6B illustrates an another temporary mobile identifier update procedure in accordance with the present disclosure.

FIG. 7A illustrates a UE and a network procedure in accordance with the present disclosure.

FIG. 8A illustrates a UE and a network procedure in accordance with the present disclosure.

FIG. 8B illustrates an another UE and a network procedure in accordance with the present disclosure.

DESCRIPTION OF EMBODIMENTS

Figure 1:
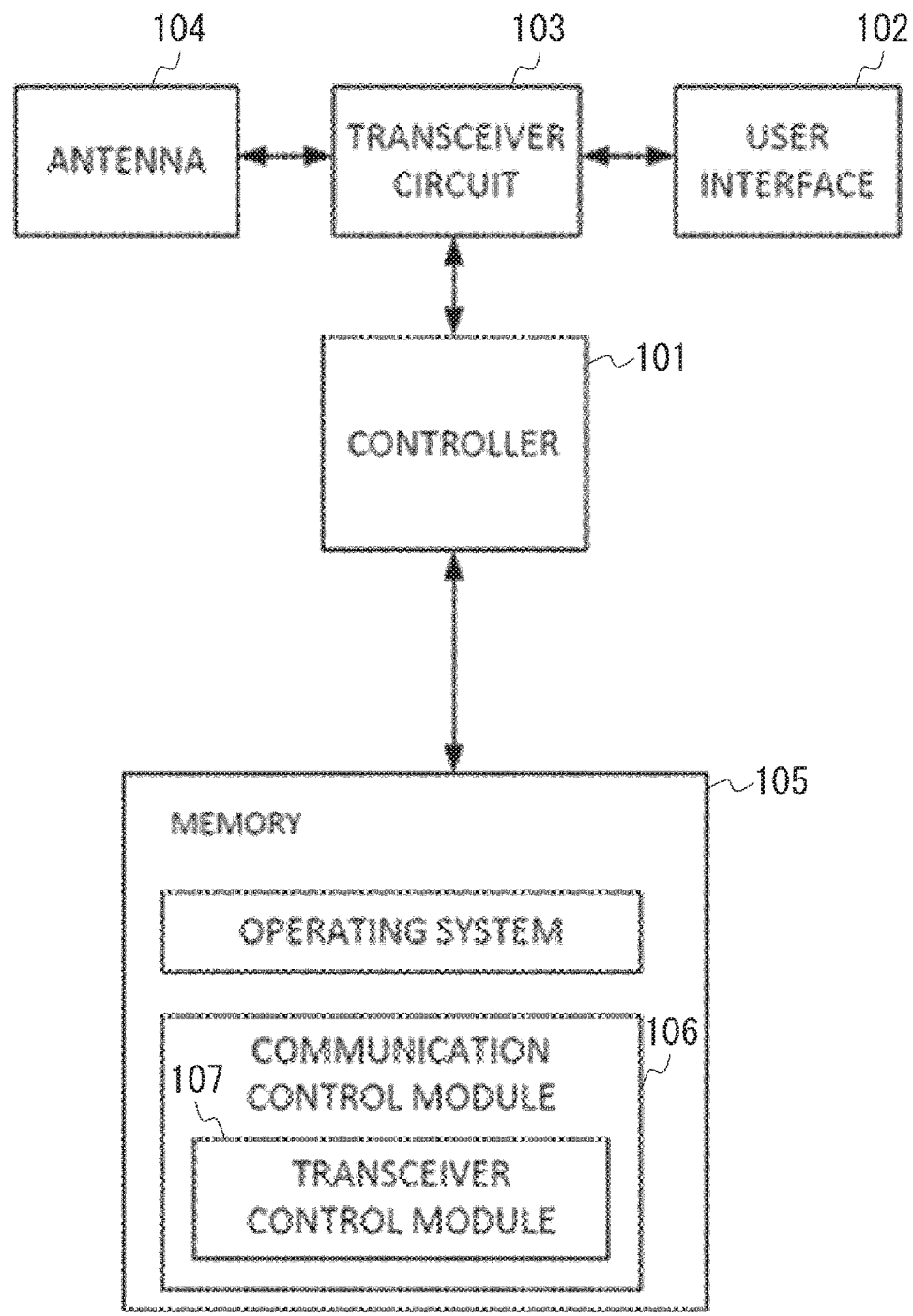
FIG. 1 illustrates a User Equipment in accordance with the present disclosure.

Exemplary aspects now will be described with reference to the accompanying drawings. The disclosure may, however, be embodied in many different forms and should not be construed as limited to the aspects set forth herein; rather, these aspects are provided so that this disclosure will be thorough and complete, and will fully convey its scope to those skilled in the art. The terminology used in the detailed description of the particular exemplary aspects illustrated in the accompanying drawings is not intended to be limiting. In the drawings, like numbers refer to like elements.

It is to be noted, however, that the reference numerals in claims illustrate only typical aspects of the present subject matter, and are therefore, not to be considered for limiting of its scope, for the subject matter may admit to other equally effective aspects.

The specification may refer to "an", "one" or "some" aspect(s) in several locations. This does not necessarily imply that each such reference is to the same aspect(s), or that the feature only applies to a single aspect. Single features of different aspects may also be combined to provide other aspects.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

In an aspect of the present disclosure as shown in FIG. 1, a User Equipment as per present disclosure is described.

As shown, the UE (100) includes a transceiver circuit (103) which is operable to transmit signals to and to receive signals from the connected node(s) via one or more antenna (104). Although not necessarily shown in FIG. 1, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller controls (101) the operation of the UE in accordance with software stored in a memory (105). The software includes, among other things, an operating system and a communications control module (106) having at least a transceiver control module (107). The communications control module (106) (using its transceiver control sub-module) is responsible for handling (generating/sending/receiving) signaling and uplink/downlink data packets between the UE and other nodes, such as the base station/(R)AN node, the AMF (and other core network nodes). Such signaling may include, for example, appropriately formatted signaling messages relating to connection establishment and maintenance (e.g. RRC connection establishment and other RRC messages), periodic location update related messages (e.g. tracking area update, paging area updates, location area update) etc. Such signaling may also include, for example, broadcast information (e.g. Master Information and System information) in a receiving case.

The term "UE" is generally intended to be synonymous with the term mobile station, mobile device, wireless device, and includes standalone mobile stations, such as terminals, cell phones, smart phones, tablets, cellular IoT devices, IoT devices, machinery. The term "UE" is also UE that is used by 3GPP.

A UE may be an equipment for production, energy related machinery (such as boilers, engines, turbines, solar panel, wind turbines, hydroelectric generator, thermal power generator, nuclear electricity generator, batteries, nuclear systems and equipment, heavy electrical machinery, pumps, compressors, vacuum pumps, fans, blowers, oil hydraulic equipment, pneumatic equipment, metal working machinery, manipulators, robots and their application systems, tools, molds and dies, rolls, conveying, elevating, materials handling equipment and their application systems, textile machinery, sewing machine, printing and related machinery, paper converting machinery, chemical machinery, mining and construction machinery and equipment, machinery and implements for agriculture, forestry and fisheries, safety and environment preservation equipment, tractor, construction machine, precision bearings, chains, gear, power transmission, lubricating equipment, valve, pipe fitting, etc.

A UE may be a transport equipment (such as rolling stocks, motor vehicle, motor cycle, bicycle, train, bus, carts, rickshaw, ship and watercraft, aircraft, rocket, satellite, drone, balloon, etc.).

Alternatively, A UE may be an information and communication equipment (such as electronic computer and related equipment, communication and related equipment, electronic component, etc.)

Alternatively, A UE may be a refrigerating machine, a refrigerating machine applied product, trade and service industry equipment, vending machine, automatic service machine, office machine and equipment, consumer electronic and electronic appliance (such as audio equipment, video equipment, loud speaker, radio, television, microwave oven, rice cooker, coffee machine, dishwasher, washing machine, dryer, electronic fans and related appliance, cleaner, etc.)

A UE may be an electrical application system (such as x-ray system, particle accelerator, radio isotope equipment, sonic equipment, electromagnetic application equipment, electronic power application equipment, etc.).

A UE may be an electronic lamp, luminaire, measuring instrument, analyzer, tester and surveying instrument (such as smoke alarm, human alarm sensor, motion sensor, wireless tag, etc.), watches and clock, laboratory instrument, optical apparatus, medical equipment and system, weapon, cutlery, hand tool.

A UE may be a wireless-equipped personal digital assistants (such as wireless cards or modules that are designed for attachment to or insertion into another electronic device (for example a personal computer, electrical measuring machine).

A UE may be a device or a part of system that provides applications, services, and solutions described below, as to "internet of things (IoT)", using a variety of wired and/or wireless communication technologies.

Applications, services, and solutions may be MVNO (Mobile Virtual Network Operator) service, emergency radio communication system, PBX (Private Branch eXchange) system, PHS/Digital Cordless Telecommunications system, POS system, advertise calling system, MBMS (Multimedia Broadcast and Multicast Service), V2X (Vehicle to Everything) system, train radio system, location related service, Disaster/Emergency Wireless Communication Service, community service, video streaming service, femto cell application service, VoLTE service, charging service, radio on demand service, roaming service, activity monitoring service, telecom carrier/communication NW selection service, functional restriction service, PoC (Proof of Concept) service, personal information management service, ad hoc network/DTN (Delay Tolerant Networking) service, etc.

Further, the above-described UE are merely examples of applications of the technical ideas and these technical ideas are not limited to the above-described UE and various modifications can be made thereto.

Figure 2:
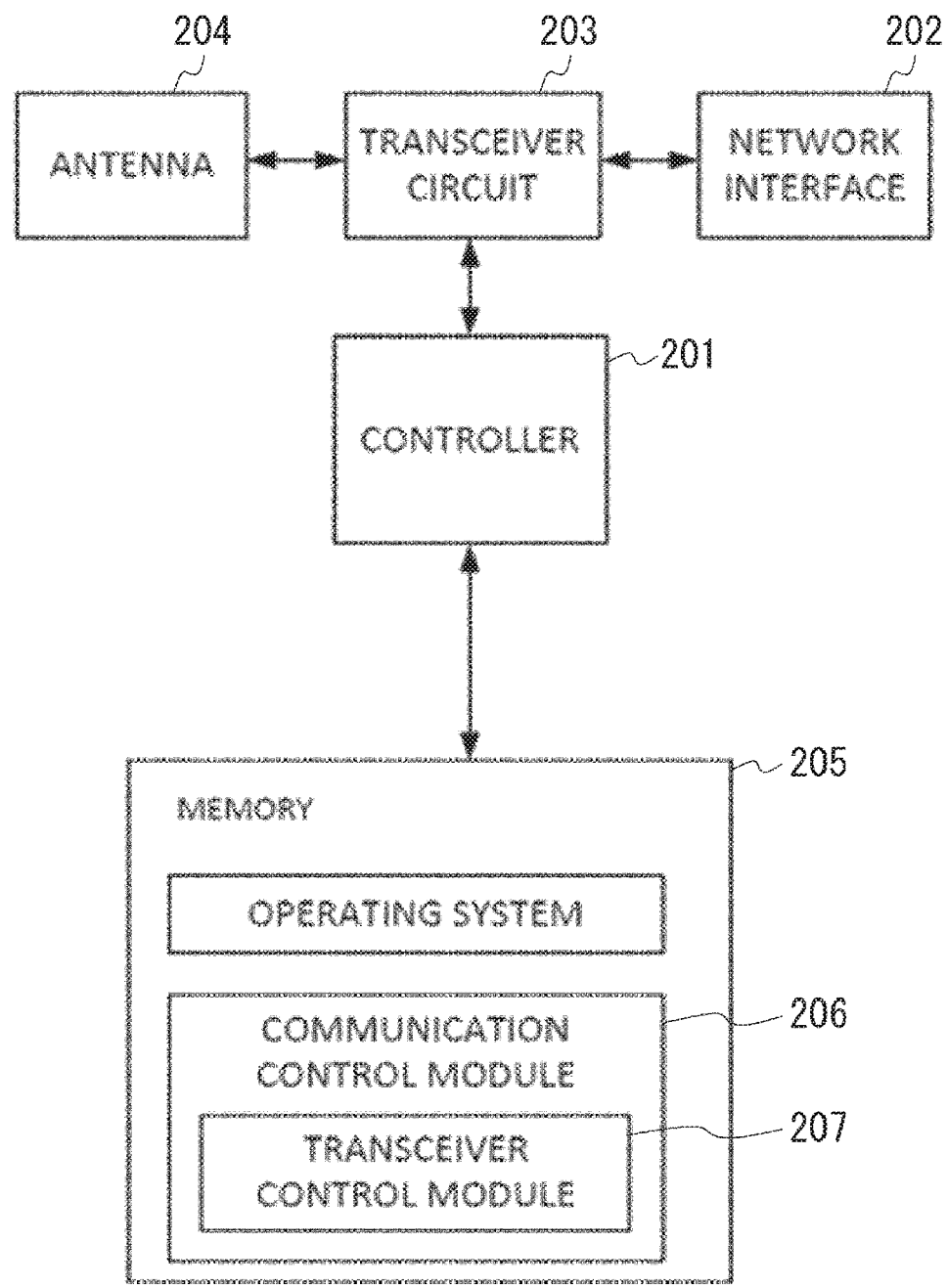
FIG. 2 illustrates a (R)AN in accordance with the present disclosure.

FIG. 2 is a block diagram illustrating the main components of an exemplary (R)AN node (200), for example a base station (e.g. 'eNB' in LTE, 'NG-RAN' 'gNB' in 5G). As shown, the (R)AN node (200) includes a transceiver circuit (203) which is operable to transmit signals to and to receive signals from connected UE(s) via one or more antenna (204) and to transmit signals to and to receive signals from other network nodes (either directly or indirectly) via a network interface. A controller (201) controls the operation of the (R)AN node in accordance with software stored in a memory (205). Software may be pre-installed in the memory and/or may be downloaded via the telecommunication network or from a removable data storage device (RMD), for example. The software includes, among other things, an operating system and a communications control module (206) having at least a transceiver control module (207). The (R)AN may include a 3GPP access node and a non-3GPP access node.

The communications control module (206) (using its transceiver control sub-module) is responsible for handling (generating/sending/receiving) signaling between the (R)AN node and other nodes, such as the UE, the MME, the AMF (e.g. directly or indirectly). The signaling may include, for example, appropriately formatted signaling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signaling may also include, for example, broadcast information (e.g. Master Information and System information) in a sending case.

The controller is also configured (by software or hardware) to handle related tasks such as, when implemented, UE mobility estimate and/or moving trajectory estimation.

Figure 3:
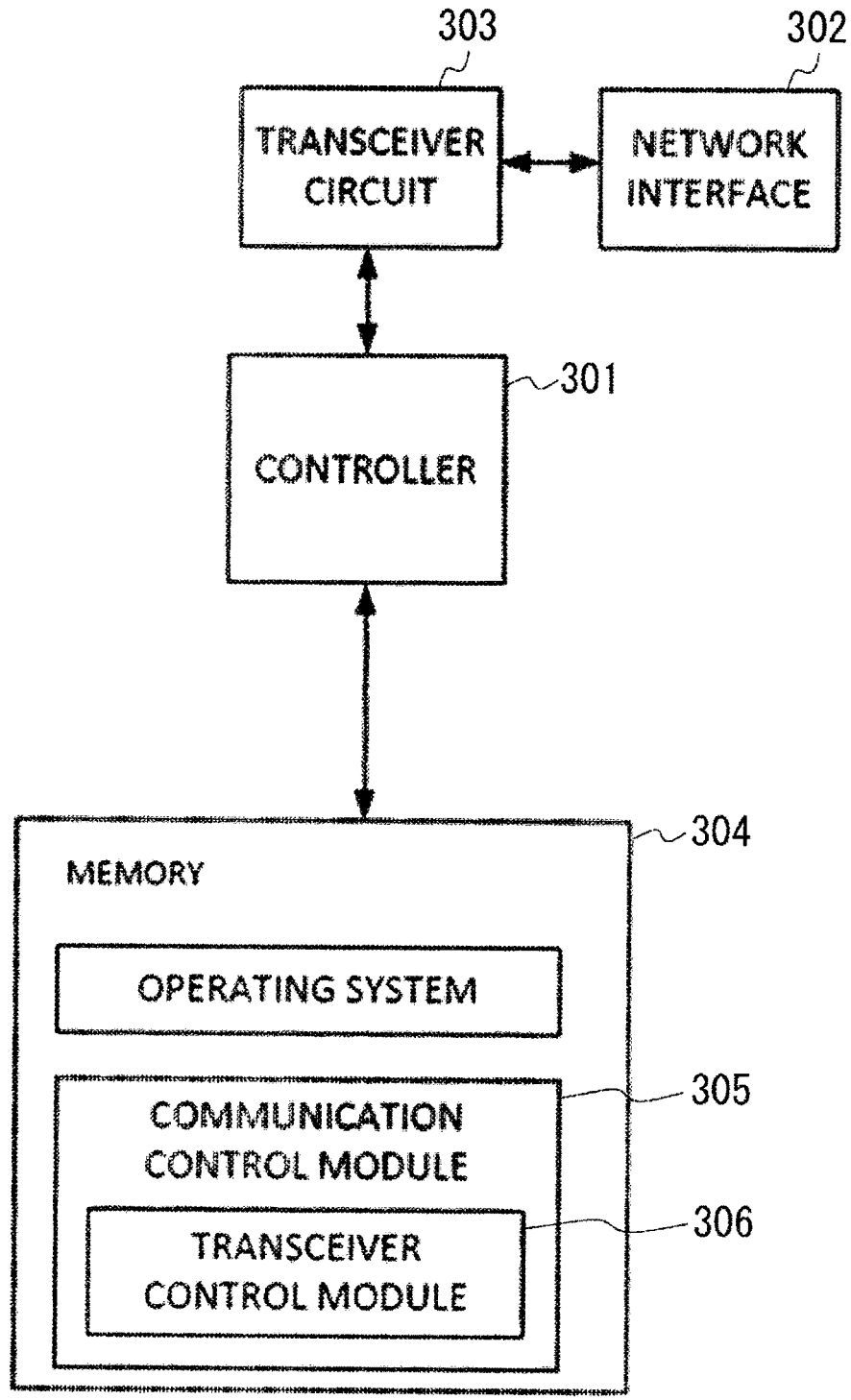
FIG. 3 illustrates an AMF in accordance with the present disclosure.

FIG. 3 is a block diagram illustrating the main components of the AMF (300). The AMF is included in the 5GC. As shown, the AMF (300) includes a transceiver circuit (303) which is operable to transmit signals to and to receive signals from other nodes (including the UE) via a network interface. A controller (301) controls the operation of the AMF (300) in accordance with software stored in a memory. Software may be pre-installed in the memory and/or may be downloaded via the telecommunication network or from a removable data storage device (RMD), for example. The software includes, among other things, an operating system and a communications control module (305) having at least a transceiver control module (306).

The communications control module (using its transceiver control sub-module) is responsible for handling (generating/sending/receiving) signaling between the AMF and other nodes, such as the UE, base station/(R)AN node (e.g. "gNB" or "eNB") (directly or indirectly). Such signaling may include, for example, appropriately formatted signaling messages relating to the procedures described herein, for example, NG AP message (i.e. a message by N2 reference point) to convey an NAS message from and to the UE, etc.

Figure 4A:
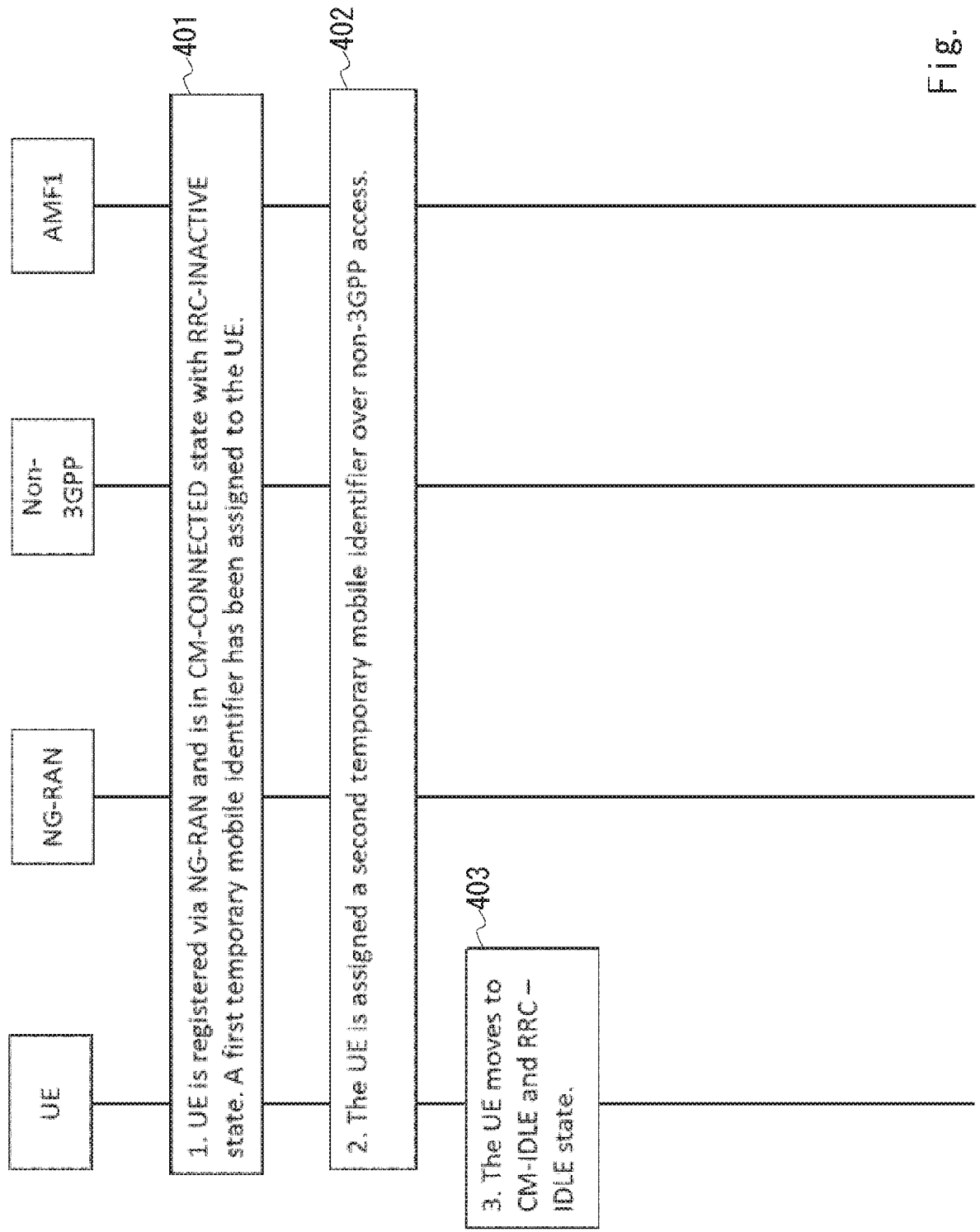
FIG. 4A illustrates a UE local release procedure in accordance with the present disclosure.

FIG. 4A describes the UE local release procedure wherein a UE releases the assigned RRC resources and moves to the RRC IDLE state when the UE's temporary mobile identity changes via non-3GPP access by the AMF.

The UE at (401) has been registered to an AMF of a PLMN with the first temporary mobile identity (e.g. 5G-GUTI) via 3GPP access. The UE has been moved to CM-CONNECTED with RRC Inactive state. More specifically, in the step 401, the UE sends a first registration request message to the AMF via the 3GPP access node (e.g. NG-RAN node) and the UE receives a first registration accept message from the AMF via the 3GPP access. The first registration request message and the first registration accept message may be a NAS message. Therefore, the messages are sent transparently through the 3GPP access node. The first registration accept message may include the first temporary mobile identity. The tuning to CM-CONNECTED with RRC Inactive state may be performed by the UE in response to instructions by the 3GPP access node. Furthermore, when the UE tunes to RRC Inactive state, the 3GPP access node may store an identity (e.g. old S-TMSI) corresponding to the first mobile identity for Radio Access Network (RAN) paging. The step 401 may be performed as a part of a first registration procedure between the UE and the AMF. At (402), the UE is assigned a second temporary mobile identity by the AMF and the second temporary mobile identity is sent to the UE in a NAS message over the non-3GPP access. More specifically, in the step 402, the UE sends a second registration request message to the same AMF via the non-3GPP access node (e.g. WLAN access point). The AMF updates from the first mobile identity to a second mobile identity for the UE. And then the UE receives a second registration accept message from the AMF via the non-3GPP access. The second registration request message and the second registration accept message may be a NAS message. Therefore, the messages are sent transparently through the non-3GPP access node. The second registration accept message may include the second temporary mobile identity. The step 402 may be performed as a part of a second registration procedure between the UE and the AMF. At (403), the UE moves to CM-IDLE state with RRC-IDLE state upon reception of the second mobile identity. Optionally, in the step 403, the UE may release the stored RRC context and resources.

The UE is assigned a second temporary mobile identity by AMF1 or by AMF2 which is not the AMF1, the second temporary mobile identity is sent to the UE in a NAS message in the following cases:

(1) when the UE is performing initial registration procedure to the AMF1 of the PLMN via Non-3GPP access; or (2) when the UE is registered to the AMF1 of the PLMN via non-3GPP access and the UE is performing the registration procedure via non-3GPP access to the AMF1 of the PLMN (e.g. due to the reason as defined in 3GPP 24.501); or (3) when the UE is in CM-CONNECTED mode and the AMF is relocated for the UE. The UE is moved to AMF2 and a new 5G-GUTI is assigned to the UE by AMF2; or (4) when the AMF1 decided to perform the AMF planned removal procedure and the AMF2 is newly assigned to the UE.

Figure 4B:
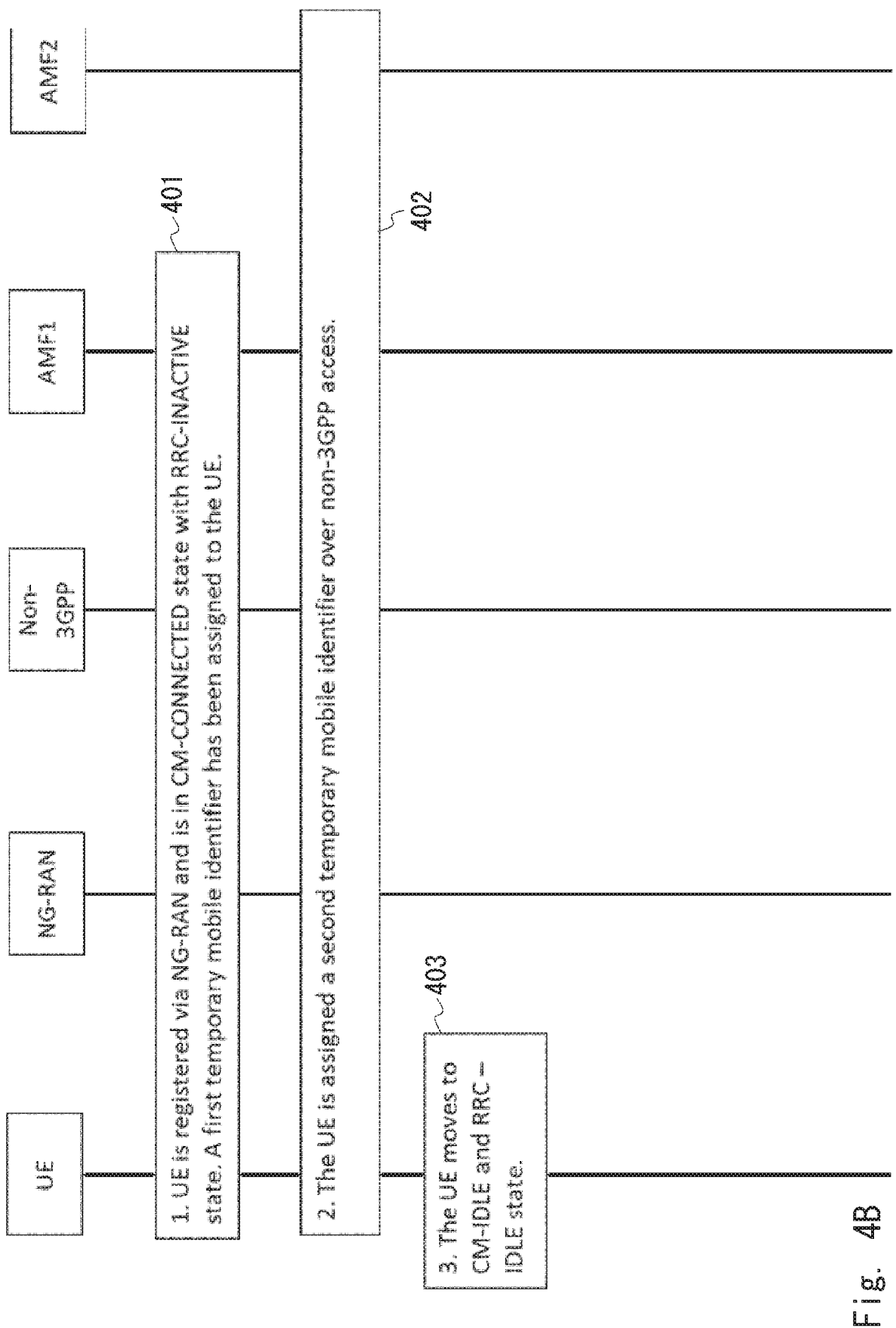
FIG. 4B illustrates an another UE local release procedure in accordance with the present disclosure.

Here, the FIG. 4B shows another UE local release procedure with AMF relocation as denoted the above some cases.

The NAS message is an existing Registration Management message (e.g. Attach Accept message, Registration Accept message or Configuration Update Command) or a new NAS message. The UE moves to CM-IDLE state with RRC-IDLE state. The UE also releases stored the RRC context and resources. The UE releases the RRC context and resources and deletes the first temporary mobile identifier.

Figure 5A:
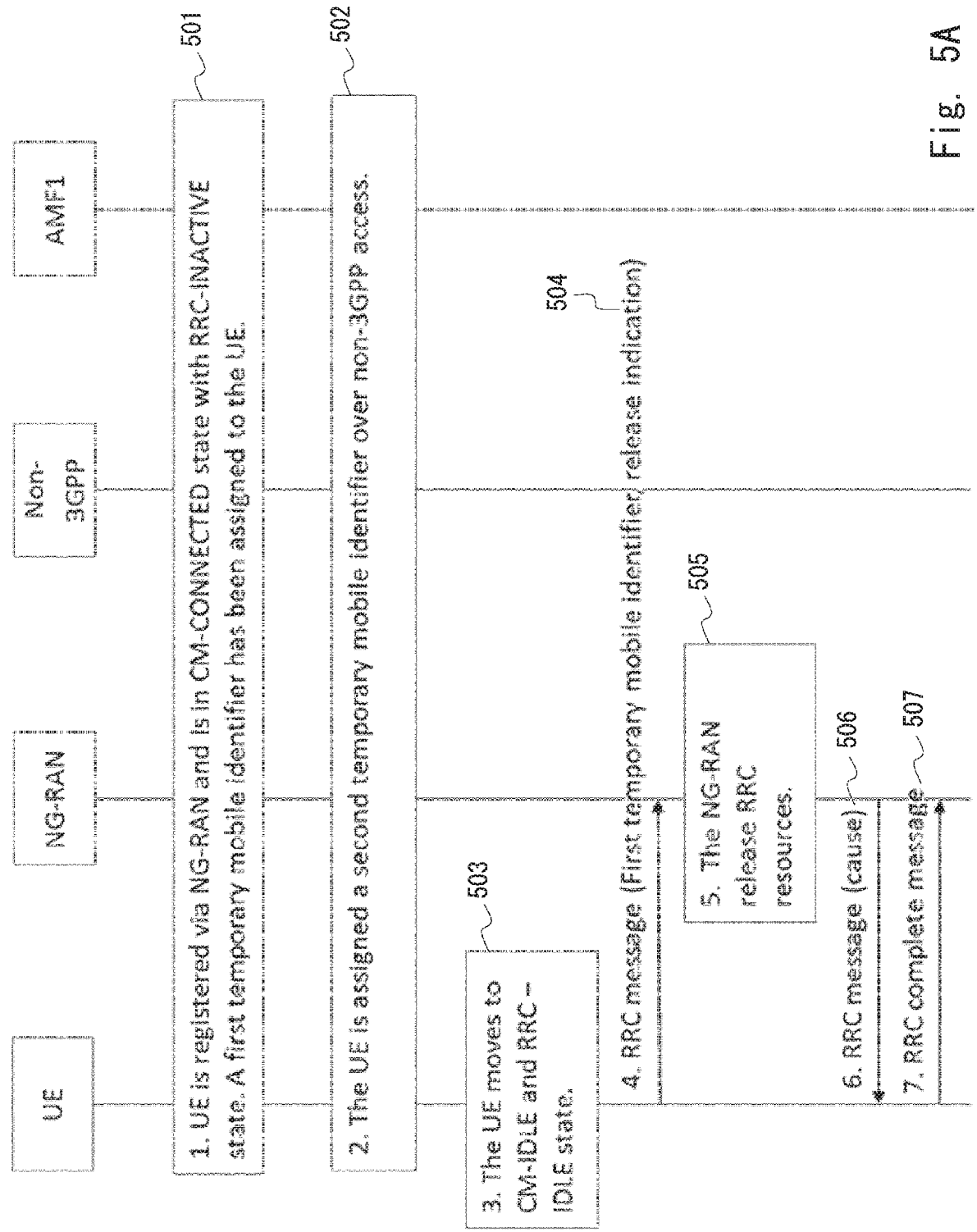
FIG. 5A illustrates a UE and NG-RAN release procedure in accordance with the present disclosure.

FIG. 5A shows the UE and NG-RAN release procedure wherein a UE and an NG-RAN releases the assigned RRC resources and moves to the RRC IDLE state when the UE's temporary mobile identity changes via non-3GPP access by the AMF.

At (501), a UE has been registered to an AMF of a PLMN with the first temporary mobile identity (e.g. 5G-GUTI) via 3GPP access. The UE has been moved to CM-CONNECTED with RRC Inactive state. More specifically, in the step 501, the UE sends a first registration request message to the AMF via the 3GPP access node (e.g. NG-RAN node) and the UE receives a first registration accept message from the AMF via the 3GPP access. The first registration request message and the first registration accept message may be a NAS message. Therefore, the messages are sent transparently through the 3GPP access node. The first registration accept message may include the first temporary mobile identity. The tuning to CM-CONNECTED with RRC Inactive state may be performed by the UE in response to instructions by the 3GPP access node. Furthermore, when the UE tunes to RRC Inactive state, the 3GPP access node may store an identity (e.g. old S-TMSI) corresponding to the first mobile identity for Radio Access Network (RAN) paging. The step 501 may be performed as a part of a first registration procedure between the UE and the AMF. At (502), the UE is assigned a second temporary mobile identity by the AMF and the second temporary mobile identity is sent to the UE in a NAS message over the non-3GPP access. More specifically, in the step 502, the UE sends a second registration request message to the same AMF via the non-3GPP access node (e.g. WLAN access point). The AMF updates from the first mobile identity to a second mobile identity for the UE. And then the UE receives a second registration accept message from the AMF via the non-3GPP access. The second registration request message and the second registration accept message may be a NAS message. Therefore, the messages are sent transparently through the non-3GPP access node. The second registration accept message may include the second temporary mobile identity. The step 502 may be performed as a part of a second registration procedure between the UE and the AMF.

Regarding the step 502, the UE is assigned a second temporary mobile identity by AMF1 or by AMF2 which is not the AMF1, the second temporary mobile identity is sent to the UE in a NAS message in the following cases:
(1) when the UE is performing initial registration procedure to the AMF1 of the PLMN via Non-3GPP access; or
(2) when the UE is registered to the AMF1 of the PLMN via non-3GPP access and the UE is performing the registration procedure via non-3GPP access to the AMF1 of the PLMN (e.g. due to the reason as defined in 3GPP 24.501); or
(3) when the UE is in CM-CONNECTED mode and the AMF for the UE is relocated. The UE is moved to AMF2 and a new 5G-GUTI is assigned to the UE by the AMF2; or
(4) when the AMF1 decided to perform the AMF planned removal procedure and the AMF2 is newly assigned to the UE.

Figure 5B:
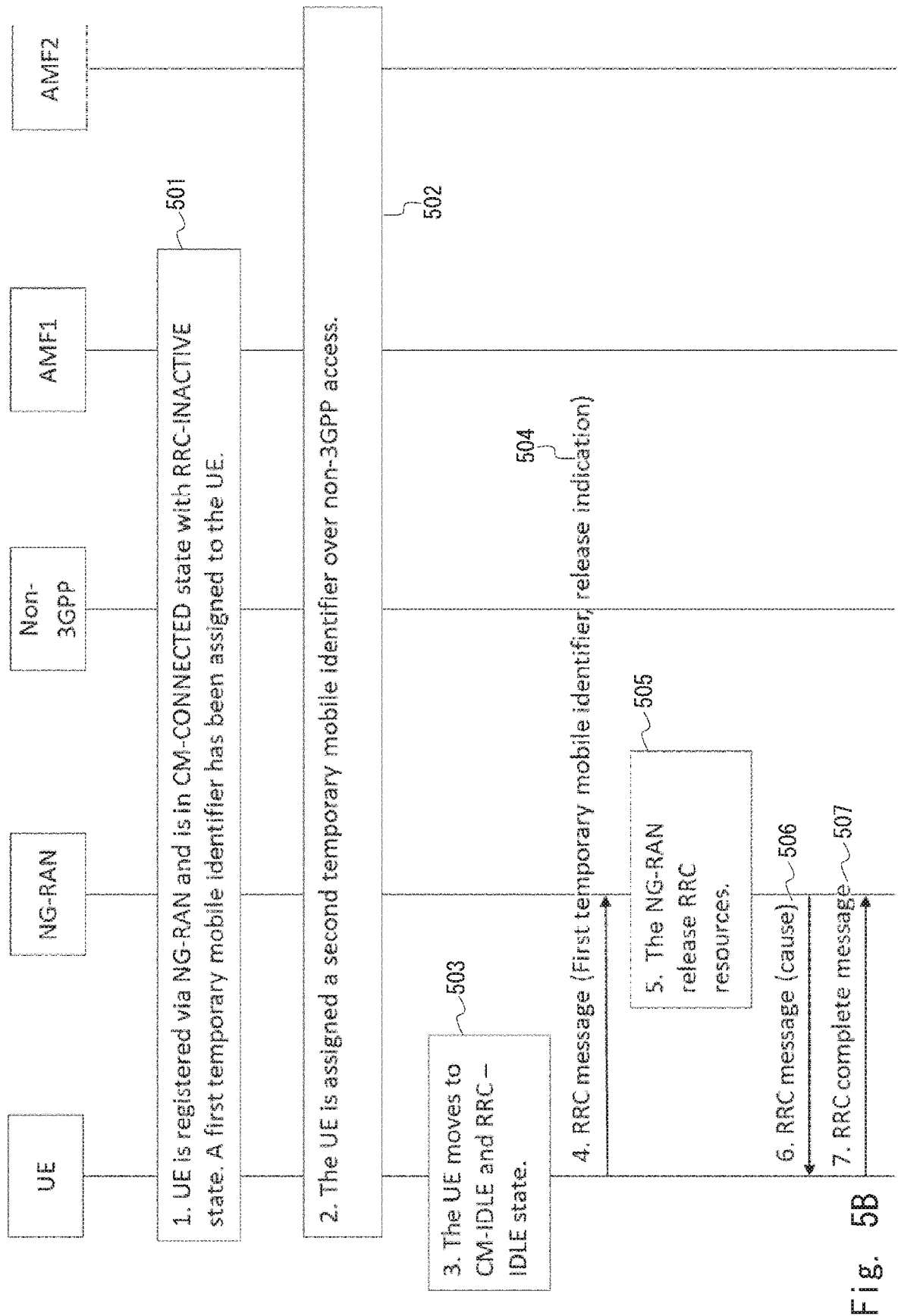
FIG. 5B illustrates an another UE and NG-RAN release procedure in accordance with the present disclosure.

Here, the FIG. 5B shows another UE and NG-RAN release procedure with AMF relocation as denoted the above some cases.

At (503), the UE moves to CM-IDLE state with RRC-IDLE state upon reception of the second mobile identity. The UE releases stored the RRC context and resources. In this scenario, the NAS message is an existing Registration Management message (e.g. Registration Accept message or Configuration Update Command) or a new NAS message. When the UE moves to CM-IDLE state with RRC-IDLE state, the UE releases the stored RRC context and resources. At (504), the UE sends an RRC message to the NG-RAN with a first temporary mobile identifier and release indication in order to let NG-RAN at (505) release RRC resources for the UE. The first temporary mobile identifier can be S-TMSI, I-RNTI, GUTI or 5G GUTI. The release indication indicates that the purpose of this message is to release RRC resources to the UE in the NG-RAN. This RRC message can be a RRC Connection Resume Request message or a RRC Connection Establishment Request message. The RRC message is a RRC RESUME REQUEST message or RRC CONNECTION REQUEST message, another existing RRC message or a new RRC message. The NG-RAN releases the RRC resources for the UE that is identified by the temporary mobile identifier. Optionally, the NG-RAN at (506) sends an RRC message to the UE. This message may have a cause that indicates successful resource release in the NG-RAN. This RRC message can be RRC Release message. The RRC message is an existing RRC message (e.g. RRC connection Resume or a new RRC message. Optionally, the UE at (507) may send the RRC complete message to the NG-RAN in response of the RRC message received to acknowledge the receipt of the RRC message. The RRC complete message may contain some UE related parameters. The UE deletes the first temporary mobile identifier.

Here, for sending the RRC message to the NG-RAN which has already no connection with the UE, the UE may keep to store information identifying the NG-RAN node even while the UE releases the stored RRC context and resources in step 503. Furthermore or alternatively, the step 503 may be performed after the step 507.

Figure 6A:
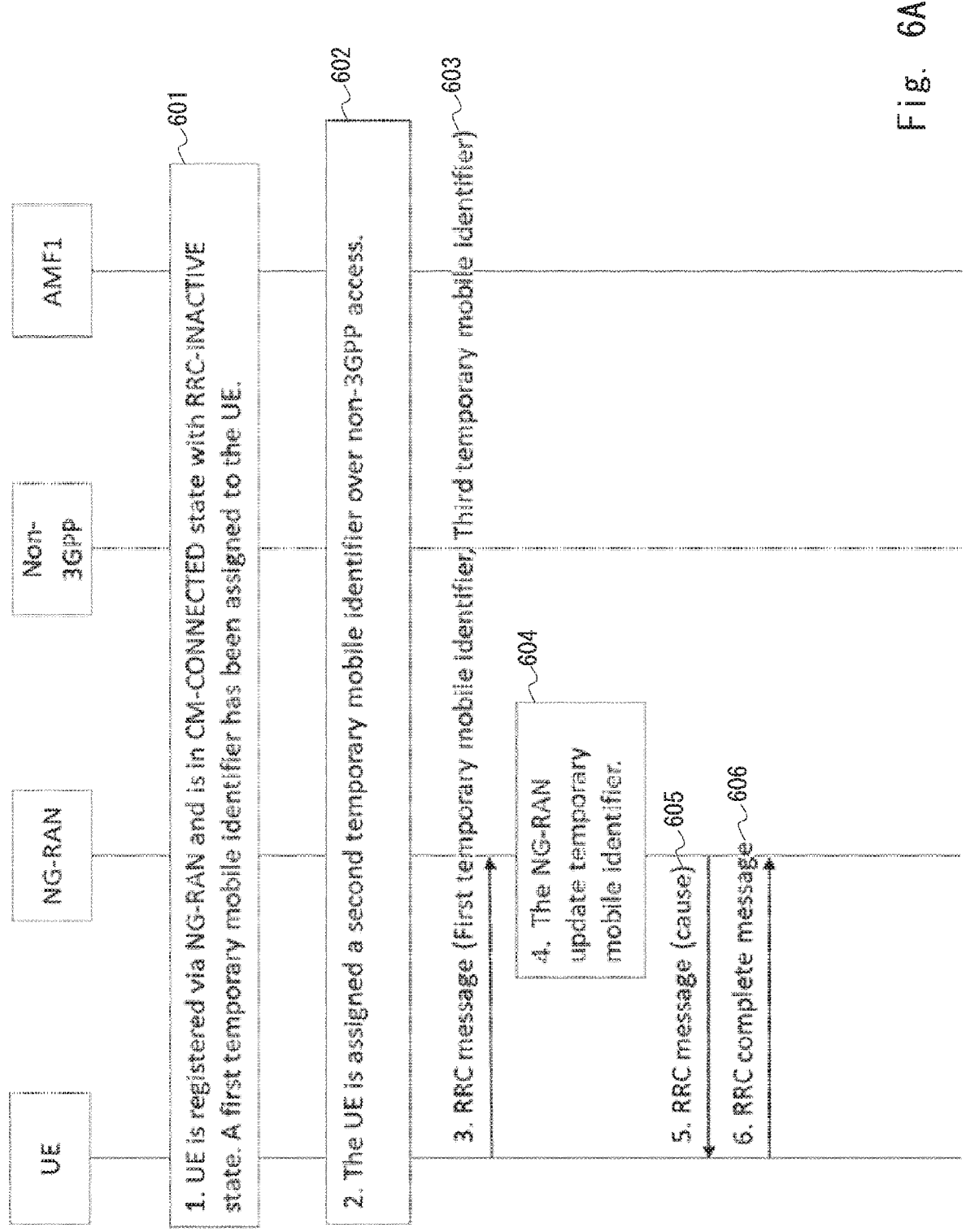
FIG. 6A illustrates a temporary mobile identifier update procedure in accordance with the present disclosure.

FIG. 6A describes the temporary mobile identifier update procedure wherein a UE updates the new temporary mobile identity to the NG-RAN by a RRC message.

At (601), a UE has been registered to an AMF of a PLMN with the first temporary mobile identity (e.g. 5G-GUTI) via 3GPP access. The UE has been moved to CM-CONNECTED with RRC Inactive state. More specifically, in the step 601, the UE sends a first registration request message to the AMF via the 3GPP access node (e.g. NG-RAN node) and the UE receives a first registration accept message from the AMF via the 3GPP access. The first registration request message and the first registration accept message may be a NAS message. Therefore, the messages are sent transparently through the 3GPP access node. The first registration accept message may include the first temporary mobile identity. The tuning to CM-CONNECTED with RRC Inactive state may be performed by the UE in response to instructions by the 3GPP access node. Furthermore, when the UE tunes to RRC Inactive state, the 3GPP access node may store an identity (e.g. old S-TMSI) corresponding to the first mobile identity for Radio Access Network (RAN) paging. The step 601 may be performed as a part of a first registration procedure between the UE and the AMF. At (602), the UE is assigned a second temporary mobile identity (e.g. 5G-GUTI) by the AMF via non-3GPP access and the second temporary mobile identity is sent to the UE in a NAS message over the non-3GPP access. More specifically, in the step 602, the UE sends a second registration request message to the same AMF via the non-3GPP access node (e.g. WLAN access point). The AMF updates from the first mobile identity to a second mobile identity for the UE. And then the UE receives a second registration accept message from the AMF via the non-3GPP access. The second registration request message and the second registration accept message may be a NAS message. Therefore, the messages are sent transparently through the non-3GPP access node. The second registration accept message may include the second temporary mobile identity. The step 602 may be performed as a part of a second registration procedure between the UE and the AMF.

Regarding the step 602, the UE is assigned a second temporary mobile identity by AMF1 or by AMF2 which is not the AMF1, the second temporary mobile identity is sent to the UE in a NAS message in the following cases:
(1) when the UE is performing initial registration procedure to the AMF1 of the PLMN via Non-3GPP access; or
(2) when the UE is registered to the AMF1 of the PLMN via non-3GPP access and the UE is performing the registration procedure via non-3GPP access to the AMF1 of the PLMN (e.g. due to the reason as defined in 3GPP 24.501); or
(3) when the UE is in CM-CONNECTED mode and the AMF is relocated for the UE. The UE is moved to AMF2 and a new 5G-GUTI is assigned to the UE by the AMF2; or
(4) when the AMF1 decided to perform the AMF planned removal procedure and the AMF2 is newly assigned to the UE.

Here, the FIG. 6B shows another UE local release procedure with AMF relocation as denoted the above some cases.

At (603), the UE sends a third temporary mobile identity (e.g. 5G-GUTI, S-TMSI) to the NG-RAN in a RRC message. The third temporary mobile identity is derived from the second temporary mobile identity or is the second temporary mobile identity. The UE and the AMF uses the third temporary mobile identity or the second temporary mobile identity in subsequent AS and NAS procedure. The NAS message is an existing NAS message (e.g. Attach Accept message, Registration Accept message or Configuration Update Command) or a new NAS message. In the step 603, the UE may sends the first temporary mobile identity addition to the third temporary mobile identity. As already mentioned the above, the third temporary identity is derived from the second temporary mobile identity (e.g. the third mobile identity is S-TMSI derived from the new-GUTI (second temporary mobile identity) or is the second temporary mobile identity (e.g. new GUTI). The first temporary mobile identity is I-RNTI as defined in 38.300, resume identity as defined in 36.331 or temporary mobile identifier e.g. 5G-GUTI or 5G-S-TMSI. The first temporary mobile identity is used by the NG-RAN to fetch the UE AS context. This RRC message can be a RRC Connection Resume Request message or a RRC Connection Establishment Request message.

At (604), the NG-RAN stores the third temporary mobile identity of the UE and the NG-RAN uses the third temporary mobile identity in subsequent procedure related to the UE (e.g. the NG-RAN sends the third temporary mobile identity when the NG-RAN initiates RAN paging when the UE is in RRC INACTIVE state in NG-RAN).

Optionally, at (605), the NG-RAN sends an RRC message to the UE. This message may have a cause that indicates successful temporary mobile identity update in the NG-RAN. This RRC message can be RRC Connection Setup message or RRC Connection Resume message or another RRC message or a new RRC message. The UE deletes the first temporary mobile identifier.

Optionally, at (606), the UE may send the RRC complete message to the NG-RAN. This RRC message can be RRC Connection Setup Complete message. RRC Connection Resume Complete message another RRC message or a new RRC message.

FIG. 7A describes the UE and a network behavior wherein the AMF updates the NG-RAN with the new temporary mobile identity assigned to the UE via non-3GPP access.

At (701), a UE has been registered to an AMF of a PLMN with the first temporary mobile identity (e.g. 5G-GUTI) via 3GPP access. The UE has been moved to CM-CONNECTED with RRC Inactive state. More specifically, in the step 701, the UE sends a first registration request message to the AMF via the 3GPP access node (e.g. NG-RAN node) and the UE receives a first registration accept message from the AMF via the 3GPP access. The first registration request message and the first registration accept message may be a NAS message. Therefore, the messages are sent transparently through the 3GPP access node. The first registration accept message may include the first temporary mobile identity. The tuning to CM-CONNECTED with RRC Inactive state may be performed by the UE in response to instructions by the 3GPP access node. Furthermore, when the UE tunes to RRC Inactive state, the 3GPP access node may store an identity (e.g. old S-TMSI) corresponding to the first mobile identity for Radio Access Network (RAN) paging. The step 701 may be performed as a part of a first registration procedure between the UE and the AMF. At (702), the UE is assigned a second temporary mobile identity (e.g. 5G-GUTI) by the AMF via non-3GPP access and the second temporary mobile identity is sent to the UE in a NAS message. More specifically, in the step 702, the UE sends a second registration request message to the same AMF via the non-3GPP access node (e.g. WLAN access point). The AMF updates from the first mobile identity to a second mobile identity for the UE. And then the UE receives a second registration accept message from the AMF via the non-3GPP access. The second registration request message and the second registration accept message may be a NAS message. Therefore, the messages are sent transparently through the non-3GPP access node. The second registration accept message may include the second temporary mobile identity. The step 702 may be performed as a part of a second registration procedure between the UE and the AMF. At (703), the AMF updates the NG-RAN with a new temporary mobile identity (denoted as a third temporary mobile identity), derived from the second temporary mobile identity assigned via a non-3GPP access, by sending the new temporary mobile identity in a NGAP message. The NG-RAN uses the new temporary mobile identity in subsequent AS and NAS procedure.

Regarding the step 702, the UE is assigned a second temporary mobile identity by AMF1 or by AMF2 which is not the AMF1, the second temporary mobile identity is sent to the UE in a NAS message in the following cases:

(1) when the UE is performing initial registration procedure to the same AMF1 of the PLMN via Non-3GPP access; or (2) when the UE is registered to the same AMF1 of the PLMN via non-3GPP access and the UE is performing the registration procedure via non-3GPP access to the same AMF1 of the PLMN (e.g. due to the reason as defined in 3GPP 24.501);

(3) when the UE is in CM-CONNECTED mode and the AMF is relocated for the UE. The UE is moved to AMF2 and a new 5G-GUTI is assigned to the UE; or (4) when the AMF1 decided to perform the AMF planned removal procedure and the AMF2 is newly assigned to the UE.

Figure 7B:
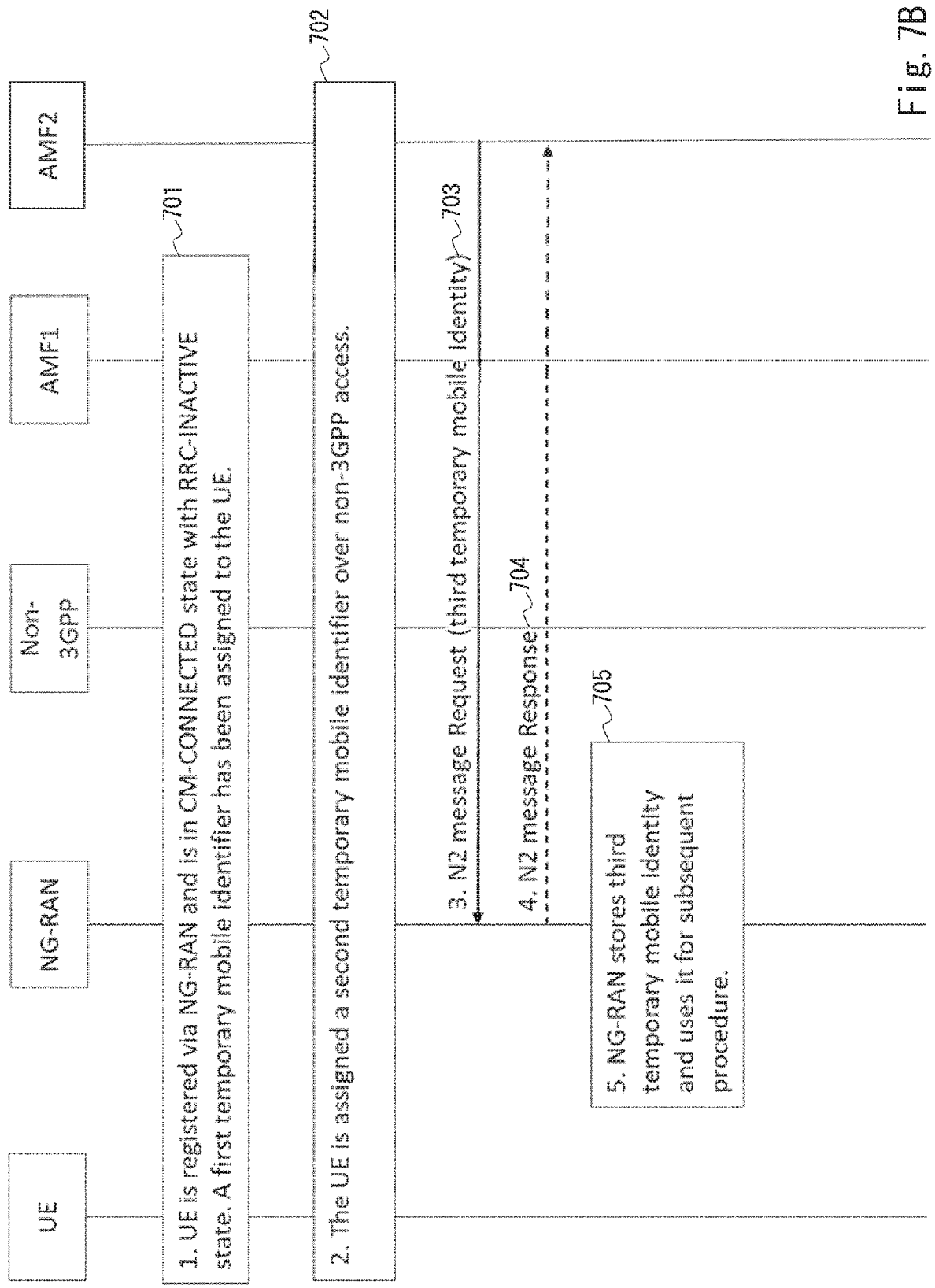
FIG. 7B illustrates an another UE and a network procedure in accordance with the present disclosure.

Here, the FIG. 7B shows another UE and a network behavior with AMF relocation as denoted the above some cases.

The NAS message is an existing NAS message (e.g. Attach Accept message, Registration Accept message or Configuration Update Command) or a new NAS message. The UE deletes the first temporary mobile identifier and uses the second mobile temporary identifier or a third mobile temporary identity derive from the second temporary mobile identity. At (703), the AMF(1 or 2) sends a message to the NG-RAN containing a third temporary mobile identity. The third temporary identity is derived from the second temporary mobile identity (e.g. the third mobile identity is S-TMSI derived from the new-GUTI (second temporary mobile identity) or is the second temporary mobile identity (e.g. new GUTI). The message is an existing NGAP message (e.g. UE CONTEXT MODIFICATION REQUEST) or a new NGAP message. At (704), the NG-RAN may send an N2 message Response to the AMF(1 or 2). At (705), the NG-RAN maintains CM-CONNECTED with RRC Inactive state for the UE with third temporary mobile identity. Then NG-RAN stores the third temporary mobile identity of the UE and the NG-RAN uses the third temporary mobile identity in subsequent procedure related to the UE (e.g. the NG-RAN sends the third temporary mobile identity when the NG-RAN initiates RAN paging when the UE is in RRC INACTIVE state.

FIG. 8A of the present disclosure discloses a UE and a network procedure wherein the N2 connection is released by the AMF.

At (801), a UE has been registered to an AMF of a PLMN with the first temporary mobile identity (e.g. 5G-GUTI) via 3GPP access. The UE has been moved to CM-CONNECTED with RRC Inactive state. More specifically, in the step 801, the UE sends a first registration request message to the AMF via the 3GPP access node (e.g. NG-RAN node) and the UE receives a first registration accept message from the AMF via the 3GPP access. The first registration request message and the first registration accept message may be a NAS message. Therefore, the messages are sent transparently through the 3GPP access node. The first registration accept message may include the first temporary mobile identity. The tuning to CM-CONNECTED with RRC Inactive state may be performed by the UE in response to instructions by the 3GPP access node. Furthermore, when the UE tunes to RRC Inactive state, the 3GPP access node may store an identity (e.g. old S-TMSI) corresponding to the first mobile identity for Radio Access Network (RAN) paging. The step 401 may be performed as a part of a first registration procedure between the UE and the AMF. At (802), the UE is assigned a second temporary mobile identity (e.g. 5G-GUTI) by the AMF and the second temporary mobile identity is sent to the UE in a NAS message. More specifically, in the step 802, the UE sends a second registration request message to the same AMF via the non-3GPP access node (e.g. WLAN access point). The AMF updates from the first mobile identity to a second mobile identity for the UE. And then the UE receives a second registration accept message from the AMF via the non-3GPP access. The second registration request message and the second registration accept message may be a NAS message. Therefore, the messages are sent transparently through the non-3GPP access node. The second registration accept message may include the second temporary mobile identity. The step 802 may be performed as a part of a second registration procedure between the UE and the AMF.

Regarding the step 802, the UE is assigned a second temporary mobile identity by AMF1, the second temporary mobile identity is sent to the UE in a NAS message in the following cases:

(1) when the UE is performing initial registration procedure to the same AMF1 of the PLMN via Non-3GPP access; or (2) when the UE is registered to the same AMF1 of the PLMN via non-3GPP access and the UE is performing the registration procedure via non-3GPP access to the same AMF1 of the PLMN (e.g. due to the reason as defined in 3GPP 24.501);

(3) when the UE is in CM-CONNECTED mode and the AMF is relocated for the UE. The UE is moved to AMF2 and a new 5G-GUTI is assigned to the UE by the AMF; or (4) when the AMF1 decided to perform the AMF planned removal procedure and the AMF2 is newly assigned to the UE.

Here, the FIG. 8B shows another UE and a network procedure with AMF relocation as denoted the above some cases.

At (803), the AMF(1 or 2) releases the connection between NG-RAN and AMF for the UE by sending a message to the NG-RAN indicating the NG-RAN to release the UE context and connection between the NG-RAN and the AMF.

In one example, the connection between NG-RAN and AMF is N2 connection. The AMF(1 or 2) initiates N2 release procedure. At (804), The NG-RAN may send an N2 message Response to the AMF(1 or 2). At (805), when the NG-RAN receives a NGAP message to request it to release the connection between the NG-RAN and the AMF, the NG-RAN releases the connection between the NG-RAN and AMF. The NG-RAN also releases the UE context stored in the NG-RAN. The NGAP message is an existing NGAP message (e.g. UE CONTEXT RELEASE COMMAND) or a new NGAP message.

After this procedure, following procedure can be taken.

(1) When the UE receives the second temporary mobile identity then the UE moves to CM IDLE state and RRC IDLE state releases the RRC resources assigned to the UE. The UE initiates a new RRC connection when a NAS procedure is initiated.

(2) The UE triggers a resume procedure by sending a RRC message. The NG-RAN rejects the Resume procedure or setup a new RRC connection.

Figure 9:
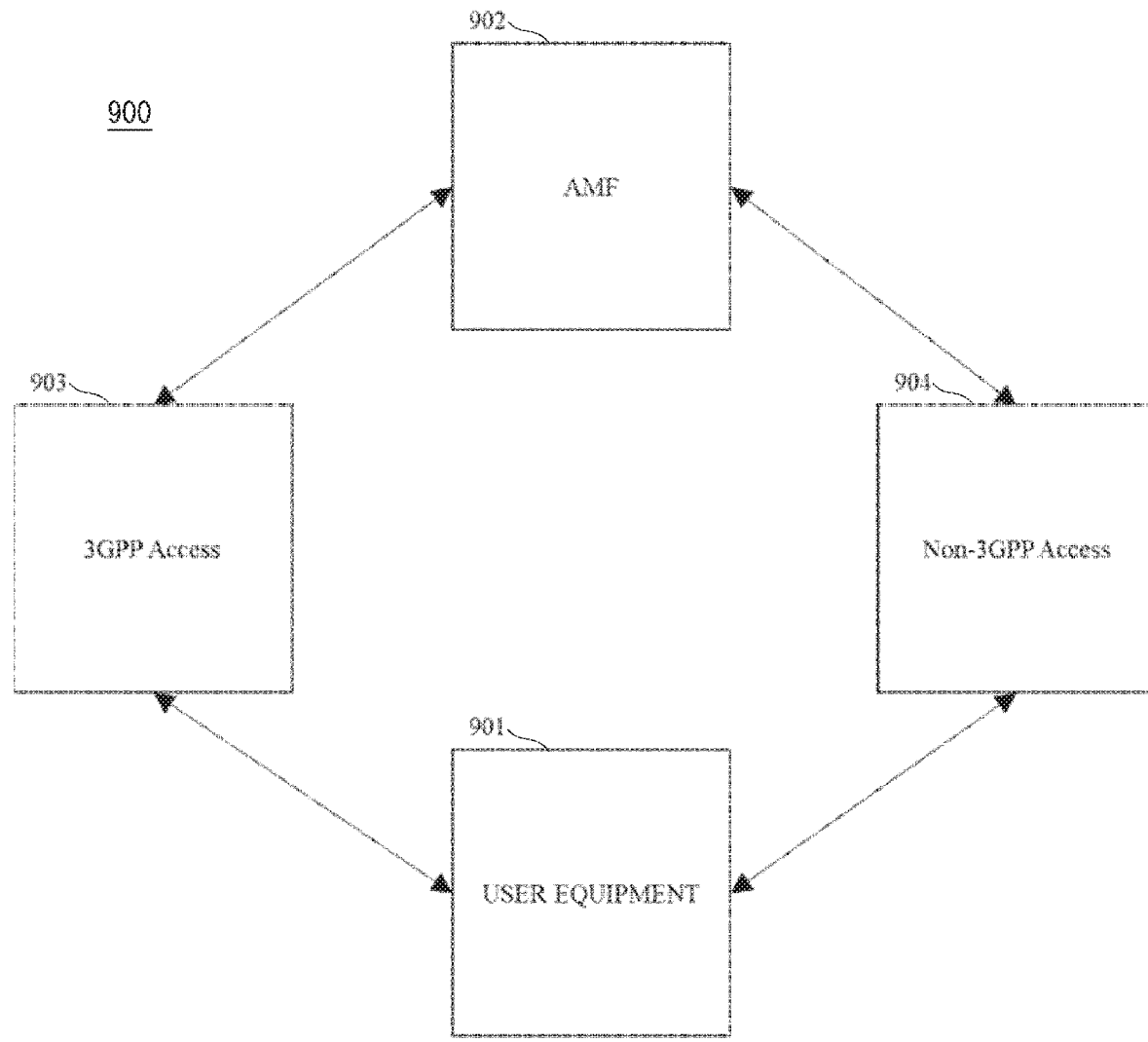
FIG. 9 illustrates a general block diagram of the communication system in accordance with the present disclosure.

FIG. 9 describes the block diagram of the communication system (900) of the present disclosure. The UE (901) in a communication network is configured to register to an AMF (902) of a PLMN over 3GPP access (NG-RAN) (903). The UE (901) is configured to register to the AMF (902) of the PLMN over non-3GPP access (WLAN node) (904). The 3GPP access (903) is configured to transfer the messages transmitted from the UE (901) to the AMF (902) and from the AMF to the UE. The non-3GPP access (903) is configured to transfer the messages transmitted from the UE (901) to the AMF (902) and from the AMF to the UE. The AMF (902) is configured to assign a temporary mobile identity to the UE.

As will be appreciated by one of skill in the art, the present disclosure may be embodied as a method, and system. Accordingly, the present disclosure may take the form of an entirely hardware aspect, a software aspect or an aspect combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

Abbreviations

For the purposes of the present disclosure, the following abbreviations apply.
5GC 5G Core Network
5GS 5G System
5G-AN 5G Access Network
5G-GUTI 5G Globally Unique Temporary Identifier
5GMM 5GS Mobility Management
5G S-TMSI 5G S-Temporary Mobile Subscription Identifier
5QI 5G QoS Identifier
AF Application Function
AMF Access and Mobility Management Function
AN Access Node
AS Access Stratum
AUSF Authentication Server Function
CP Control Plane
CM Connection Management
DL Downlink
DN Data Network
DNAI DN Access Identifier
DNN Data Network Name
EDT Early Data Transmission
EPS Evolved Packet System
EPC Evolved Packet Core
FQDN Fully Qualified Domain Name
GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-RNTII-Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UDSF Unstructured Data Storage Function
UL Uplink
UL CL Uplink Classifier
UPF User Plane Function
UDR Unified Data Repository
URSP UE Route Selection Policy

REFERENCE SIGNS LIST 101 controller
102 user interface
103 transceiver circuit
104 antenna
105 memory
106 communication control module
107 transceiver control module
201 controller
202 network interface
203 transceiver circuit
204 antenna
205 memory
206 communication control module
207 transceiver control module
301 controller
302 network interface
303 transceiver circuit
304 memory
305 communication control module
306 transceiver control module

The invention claimed is:

1. A method for an Access and Mobility Management Function (AMF), the method comprising:
sending, to a User Equipment (UE), over a 3GPP access, a first temporary mobile identity for the UE, during a first Non Access Stratum (NAS) procedure between the UE and the AMF;
sending, to the UE, over a Non-3GPP access, a second temporary mobile identity for the UE, different from the first temporary mobile identity for the UE, during a second NAS procedure between the UE and the AMF; and
sending, to a Next Generation Radio Access Network (NG-RAN) in the 3GPP access, a third temporary mobile identity for the UE, the third temporary mobile identity for the UE derived from the second temporary mobile identity for the UE, wherein the third temporary mobile identity for the UE is used for paging, and wherein the first temporary mobile identity is sent to the UE configured to transition to a Connection Management (CM) CONNECTED state with a Radio Resource Control (RRC) INACTIVE state.

2. An Access and Mobility Management Function (AMF) comprising:

at least one processor; and a memory coupled to the at least one processor, wherein the at least one processor is configured to:

send, to a User Equipment (UE), over a 3GPP access, a first temporary mobile identity for the UE, during a first Non Access Stratum (NAS) procedure between the UE and the AMF;

send, to the UE, over a Non-3GPP access, a second temporary mobile identity for the UE, different from the first temporary mobile identity for the UE, during a second NAS procedure between the UE and the AMF; and send, to a Next Generation Radio Access Network (NG-RAN) in the 3GPP access, a third temporary mobile identity for the UE, the third temporary mobile identity for the UE derived from the second temporary mobile identity for the UE, wherein the third temporary mobile identity is used for paging, and wherein the first temporary mobile identity is sent to the UE configured to transition to a Connection Management (CM) CONNECTED state with a Radio Resource Control (RRC) INACTIVE state.

\* \* \* \* \*